(12) United States Patent
Yamamoto

(10) Patent No.: US 9,717,967 B2
(45) Date of Patent: Aug. 1, 2017

(54) METHOD AND COMPUTER-READABLE STORAGE MEDIUM FOR FITTING TENNIS RACKET AND ANALYSIS DEVICE

(71) Applicant: DUNLOP SPORTS CO. LTD., Kobe-shi, Hyogo (JP)

(72) Inventor: Yosuke Yamamoto, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 589 days.

(21) Appl. No.: 13/651,825

(22) Filed: Oct. 15, 2012

(65) Prior Publication Data
US 2013/0158939 A1 Jun. 20, 2013

(30) Foreign Application Priority Data

Oct. 14, 2011 (JP) ................. 2011-226495
Oct. 12, 2012 (JP) ................. 2012-227519
Oct. 12, 2012 (JP) ................. 2012-227520

(51) Int. Cl.
*G06F 17/00* (2006.01)
*A63B 60/42* (2015.01)
(Continued)

(52) U.S. Cl.
CPC .......... *A63B 59/0074* (2013.01); *A63B 60/42* (2015.10); *G06F 17/00* (2013.01); *G09B 19/0038* (2013.01)

(58) Field of Classification Search
CPC .. A63B 69/38; A63B 69/3632; A63B 2102/02
(Continued)

(56) References Cited

U.S. PATENT DOCUMENTS 4,163,941 A * 8/1979 Linn, Jr. ................. 324/178
RE31,419 E * 10/1983 Frolow ................. 473/522
(Continued)

FOREIGN PATENT DOCUMENTS

JP 2002-126147 A 5/2002
JP 2006-263340 A 10/2006
(Continued)

OTHER PUBLICATIONS

Chinese Office Action and Search Report, dated Dec. 20, 2016, for Chinese Application No. 201310109310.2, as well as an English translation.
(Continued)

*Primary Examiner* — Toan Le
*Assistant Examiner* — Jeffrey Aiello
(74) *Attorney, Agent, or Firm* — Birch, Stewart, Kolasch & Birch, LLP

(57) ABSTRACT

A tennis racket fitting method according to the present invention comprises: a first step of preparing a plurality of test tennis rackets, at least one type of racket property that influences swing for hitting a ball being defined for each of the test tennis rackets; a second step of causing a reference tennis racket to be swung at least one time by a user in order to hit a tennis ball, and acquiring a measured value by measuring transition in at least one of the position, the velocity, the acceleration, and the angular velocity of the reference tennis racket in at least a portion of an interval from when the swing starts until when the swing ends; a third step of calculating at least one evaluation indicator to be an evaluation of the swing of the reference tennis racket based on the measured value; and a fourth step of, based on the racket property, selecting a tennis racket that can improve at least one evaluation indicator from among the test tennis rackets.

17 Claims, 10 Drawing Sheets

(51) Int. Cl.
*A63B 59/00* (2015.01)
*G09B 19/00* (2006.01)

(58) Field of Classification Search
USPC .... 73/1.01, 9, 11.01, 11.04, 12.01; 473/464, 473/463, 461, 524, 521, 201, 151
See application file for complete search history.

(56) References Cited

U.S. PATENT DOCUMENTS

| | | | | |
|---|---|---|---|---|
| 5,593,155 | A | * | 1/1997 | Fauble et al. ................ 473/463 |
| 5,613,916 | A | * | 3/1997 | Sommer ............ A63B 53/0466 473/332 |
| 5,988,861 | A | * | 11/1999 | Baum ........................ 702/142 |
| 6,062,993 | A | * | 5/2000 | Rodriguez .................... 473/424 |
| 6,134,965 | A | * | 10/2000 | Somville ............... A63B 49/00 473/461 |
| 6,755,072 | B1 | * | 6/2004 | Kanemitsu et al. ......... 73/11.01 |
| 6,793,585 | B1 | * | 9/2004 | Miyamoto ......... A63B 24/0003 273/108.2 |
| 2002/0160866 | A1 | * | 10/2002 | Matsuoka et al. ........... 473/519 |
| 2003/0109322 | A1 | * | 6/2003 | Funk ................ A63B 24/0003 473/222 |
| 2004/0077438 | A1 | * | 4/2004 | Choi ........................... 473/553 |
| 2005/0202892 | A1 | * | 9/2005 | Otten ............... A63B 69/3614 473/151 |
| 2005/0227775 | A1 | * | 10/2005 | Cassady ................ A63B 15/00 473/225 |
| 2006/0073920 | A1 | * | 4/2006 | Kunsman ..................... 473/464 |
| 2006/0084516 | A1 | * | 4/2006 | Eyestone .......... A63B 69/3632 473/219 |
| 2006/0166737 | A1 | | 7/2006 | Bently |
| 2008/0085778 | A1 | * | 4/2008 | Dugan .............. A63B 69/3623 473/223 |
| 2009/0222206 | A1 | * | 9/2009 | Burns ................. G01B 5/0023 702/1 |
| 2011/0183787 | A1 | * | 7/2011 | Schwenger ........... A63B 49/00 473/553 |

FOREIGN PATENT DOCUMENTS

| | | |
|---|---|---|
| JP | 2007-229197 A | 9/2007 |
| JP | 2009-125499 A | 6/2009 |
| JP | 2011-97980 A | 5/2011 |

OTHER PUBLICATIONS

European Office Action, dated Mar. 29, 2017, for European Application No. 12188547.9.
Japanese Office Action, dated Apr. 25, 2017, for Japanese Application No. 2012-227519, with an English translation.
Japanese Office Action, dated Apr. 25, 2017, for Japanese Application No. 2012-227520, with an English translation.

* cited by examiner (ii)

| Power | Ball grip | Impact Shock |
|---|---|---|
| 10.0 | 10.0 | 10.0 |

(iii)

| Power | Ball grip | Impact Shock |
|---|---|---|
| 8.2 | 11.8 | 13.3 |

(iv)

| Power | Ball grip | Impact Shock |
|---|---|---|
| 9.8 | 11.4 | 8.5 |

(ii)

| Power | Ball grip | Impact shock |
|---|---|---|
| 10.0 | 10.0 | 10.0 |

(iii)

| Power | Ball grip | Impact shock |
|---|---|---|
| 8.8 | 10.7 | 12.1 |

(iv)

| Power | Ball grip | Impact shock |
|---|---|---|
| 9.8 | 13.3 | 8.2 |

METHOD AND COMPUTER-READABLE STORAGE MEDIUM FOR FITTING TENNIS RACKET AND ANALYSIS DEVICE

TECHNICAL FIELD

The present invention relates to a tennis racket fitting method, fitting program, and analyzing apparatus.

BACKGROUND ART

A tennis swing differs from player to player. A swing is influenced by the specifications of the tennis racket. For example, attempting to hit a ball at high speed with a racket that has a low coefficient of restitution will cause the player to strain. On the other hand, attempting to control the velocity when hitting a ball with a racket whose coefficient of restitution is too high will cause looseness in the player's hand. It is important to have a match between the player and the racket. In order to do that, appropriate swing analysis is necessary, and it can contribute to an improvement in the player's skill. Appropriate swing analysis can contribute to research and development for tennis racket, which will contribute to sales of tennis racket.

Various techniques have been considered for such swing analysis, and as one example, Patent Document 1 discloses an apparatus for analyzing racket behavior based on images obtained by filming a swing with three high-speed cameras.

Also, Patent Document 2 discloses a swing speed measuring method, and in this method, a magnet is attached to the tip of a racket. The swing speed can then be calculated by detecting the passage of this magnet with a sensor.

Furthermore, Patent Document 3 discloses a method for analyzing a swing using a triaxial acceleration sensor and a triaxial gyroscope.

CITATION LIST

Patent Literature

Patent Literature 1: JP 2002-126147A
Patent Literature 2: JP 2006-263340A
Patent Literature 3: JP 2009-125499A

SUMMARY OF INVENTION

However, although Patent Documents 1 and 3 disclose techniques regarding swing analysis, they do not recite techniques regarding tennis racket fitting. Also, although Patent Document 2 discloses a technique for selecting an appropriate racket by performing racket swing analysis, only swings in which a ball is not hit are analyzed, and therefore it is not possible to appropriately select a racket suited to actual hits.

The present invention was achieved in order to solve the above-described problems, and an object thereof is to provide a tennis racket fitting method, fitting program, and analyzing apparatus that allow the selection of a tennis racket that is suited to a player by analyzing a swing that reflects the actual hitting of a ball.

A first tennis racket fitting method according to the present invention includes:

a first step of preparing a plurality of test tennis rackets, at least one type of racket property that influences swing for hitting a ball being defined for each of the test tennis rackets;

a second step of making a user swing a reference tennis racket at least one time in order to hit a tennis ball, and acquiring a measured value by measuring transition in at least one of the position, the velocity, the acceleration, and the angular velocity of the reference tennis racket in at least a portion of an interval from the start of the swing to the end of the swing;

a third step of calculating based on the measured value at least one evaluation indicator to be an evaluation of the swing of the reference tennis racket; and a fourth step of, based on the racket property, selecting a tennis racket that can improve at least one evaluation indicator from among the test tennis rackets.

In the above-described fitting method, a configuration is possible in which the following are repeated at least one time after the fourth step:

a fifth step of making the user swing the selected tennis racket at least one time by the user in order to hit the tennis ball, and acquiring a measured value by measuring transition in at least one of the position, the velocity, the acceleration, and the angular velocity of the selected tennis racket in at least a portion of an interval from when the swing starts until when the swing ends;

a sixth step of calculating at least one evaluation indicator to be an evaluation of the swing of the selected tennis racket based on the measured value; and a seventh step of, based on the racket property, selecting a tennis racket that can improve at least one evaluation indicator from among the test tennis rackets.

In the above-described fitting methods, the racket property can be at least one of the weight, the face area, the maximum frame thickness, the minimum frame thickness, the flex, the length, the number of main strings, and the number of cross strings of the test tennis racket.

In the above-described fitting methods, the racket property can be a numerical value defined using at least one of the weight, the face area, the maximum frame thickness, the minimum frame thickness, the flex, the length, the number of main strings, and the number of cross strings of the test tennis racket.

In the above-described fitting methods, one racket property can be a power property quantified using at least the face area so as to reflect a ball flight distance.

In the above-described fitting method, one racket property can a ball grip property quantified using at least the flex so as to reflect suitability of a timing of ball release.

In the above-described fitting methods, one racket property can be an impact shock property quantified using at least the maximum frame thickness so as to reflect suitability of a sense of impact during a hit.

In the above-described fitting methods, a configuration is possible in which in the second step, a plurality of measured values are acquired by performing the swing of the test tennis racket a plurality of times, and in the third step, the evaluation indicator is calculated by averaging the evaluation indicators calculated from the plurality of measured values.

A first non-transitory computer-readable recording medium according to the present invention storing a tennis racket fitting program for causing a computer to perform:

a first step of storing information regarding a plurality of test tennis rackets, at least one type of racket property that influences swing for hitting a ball being defined for each of the test tennis rackets;

a second step of, when a reference tennis racket is swung at least one time by a user in order to hit a tennis ball, receiving, as a measured value, transition in at least one of the position, the velocity, the acceleration, and the angular velocity of the reference tennis racket measured in at least a portion of an interval from when the swing starts until when the swing ends;

a third step of calculating at least one evaluation indicator to be an evaluation of the swing of the reference tennis racket based on the measured value; and a fourth step of, based on the racket property, selecting a tennis racket that can improve at least one evaluation indicator from among the test tennis rackets.

In the above-described non-transitory computer-readable recording medium, a configuration is possible in which the following are repeated at least one time after the fourth step:

a fifth step of, when the selected tennis racket is swung at least one time by the user in order to hit a tennis ball, receiving, as a measured value, transition in at least one of the position, the velocity, the acceleration, and the angular velocity of the selected tennis racket measured in at least a portion of an interval from when the swing starts until when the swing ends;

a sixth step of calculating at least one evaluation indicator to be an evaluation of the swing of the selected tennis racket based on the measured value; and a seventh step of, based on the racket property, selecting a tennis racket that can improve at least one evaluation indicator from among the test tennis rackets.

In the above-described non-transitory computer-readable recording mediums, the racket property can be at least one of the weight, the face area, the maximum frame thickness, the minimum frame thickness, the flex, the length, the number of main strings, and the number of cross strings of the test tennis racket.

In the above-described non-transitory computer-readable recording mediums, the racket property can be a numerical value defined using at least one of the weight, the face area, the maximum frame thickness, the minimum frame thickness, the flex, the length, the number of main strings, and the number of cross strings of the test tennis racket.

In the above-described non-transitory computer-readable recording mediums, one racket property can be a power property quantified using at least the face area so as to reflect a ball flight distance.

In the above-described non-transitory computer-readable recording mediums, one racket property can be a ball grip property quantified using at least the flex so as to reflect suitability of a timing of ball release.

In the above-described non-transitory computer-readable recording mediums, one racket property can be an impact shock property quantified using at least the maximum frame thickness so as to reflect suitability of a sense of impact during a hit.

In the above-described non-transitory computer-readable recording mediums, a configuration is possible in which in the second step, a plurality of measured values obtained from the swing of the test tennis racket a plurality of times, are received, and in the third step, the evaluation indicator is calculated by averaging the evaluation indicators calculated from the plurality of measured values.

A first analyzing apparatus for tennis racket fitting according to the present invention comprising:

a first storage unit storing information regarding a plurality of test tennis rackets, at least one type of racket property that influences swing for hitting a ball being defined for each of the test tennis rackets;

a second storage unit storing, when a reference tennis racket is swung at least one time by a user in order to hit a tennis ball, as a measured value, transition in at least one of the position, the velocity, the acceleration, and the angular velocity of the reference tennis racket measured in at least a portion of an interval from when the swing starts until when the swing ends;

a calculation unit that calculates at least one evaluation indicator to be an evaluation of the swing of the reference tennis racket based on the measured value; and a racket selection unit that, based on the racket property, selects a tennis racket that can improve at least one evaluation indicator from among the test tennis rackets.

According to this aspect of the present invention, at least one type of racket property that influences a swing for hitting a ball is defined for multiple test tennis rackets. Also, an evaluation indicator for swing evaluation is calculated based on measured values obtained by measurement when a racket is swung, and evaluation is performed on that racket. A racket that can improve the evaluation indicator is then selected from among the test tennis rackets based on the racket property. Accordingly, in racket fitting, the racket that is to be swung next is selected based on a racket property, thus enabling finding a racket that is suited to the user with fewer swings compared to the case of simply trying multiple rackets. This enables effective fitting.

The following describes a second aspect of the present invention.

A second tennis racket fitting method according to the present invention includes:

a first step of causing a reference tennis racket to be swung at least one time by a user in order to hit a tennis ball, and acquiring a reference measured value by measuring transition in at least one of the position, the velocity, the acceleration, and the angular velocity of the reference tennis racket in at least a portion of an interval from when the swing starts until when the swing ends;

a second step of calculating at least one reference evaluation indicator to be an evaluation of the swing of the reference tennis racket based on the reference measured value;

a third step of causing at least one test tennis racket to be swung at least one time by the user in order to hit the tennis ball, and acquiring a test measured value by measuring transition in at least one of the acceleration and the angular velocity of the test tennis racket in at least a portion of an interval from when the swing starts until when the swing ends;

a fourth step of calculating at least one test evaluation indicator to be an evaluation of the swing of the test tennis racket based on the test measured value;

a fifth step of, based on a predetermined reference, comparing the reference evaluation indicator and the test evaluation indicator; and a sixth step of, if it is determined in the fifth step that the test evaluation indicator is higher than the reference evaluation indicator, determining the test tennis racket with which the test evaluation indicator was obtained to be a recommended tennis racket.

Although an evaluation indicator is calculated by swinging at least one test tennis racket in the above-described fitting method, a configuration is possible in which a test evaluation indicator calculated by swinging one test tennis racket is compared with a reference evaluation indicator, and a configuration is possible in which multiple test tennis rackets are swung, test evaluation indicators are obtained for the rackets, and then these test evaluation indicators are collectively compared with a reference evaluation indicator. Also either the first or the third step may be performed first.

In the above-described fitting method, a configuration is possible in which in the fifth step, if it is determined that the test evaluation indicator is lower than the reference evaluation indicator, another test tennis racket is selected, and the third to fifth steps are repeated using the selected test tennis racket.

Also, in the above-described fitting methods, a configuration is possible in which a racket property that can reflect the evaluation indicator is set in advance for the reference tennis racket and the test tennis rackets, and the selection of the other test tennis racket is performed based on the racket property.

Also, in the above-described fitting methods, a configuration is possible in which in the first and third steps, the reference tennis racket and the test tennis racket are swung multiple times so as to acquire multiple reference measured values and test measured values, and in the second and fourth steps, the reference evaluation indicator and the test evaluation indicator are calculated by obtaining averages for the evaluation indicators calculated based on the reference measured values and the test measured values.

Also, in the above-described fitting methods, the reference evaluation indicator and the test evaluation indicator can be the grip velocity, the head velocity, the head velocity component, the swing trajectory, the racket angular velocity of the tennis rackets, or any combination of these.

A second non-transitory computer-readable recording medium according to the present invention storing a tennis racket fitting program for causing a computer to perform:

a first step of, when a reference tennis racket is swung at least one time by a user in order to hit a tennis ball, receiving, as a measure value, transition in at least one of the position, the velocity, the acceleration, and the angular velocity of the reference tennis racket in at least a portion of an interval from when the swing starts until when the swing ends;

a second step of calculating at least one reference evaluation indicator to be an evaluation of the swing of the reference tennis racket based on the reference measured value;

a third step of, when at least one test tennis racket is swung at least one time by the user in order to hit the tennis ball, receiving, as a test measured value, transition in at least one of the acceleration and the angular velocity of the test tennis racket in at least a portion of an interval from when the swing starts until when the swing ends;

a fourth step of calculating at least one test evaluation indicator to be an evaluation of the swing of the test tennis racket based on the test measured value;

a fifth step of, based on a predetermined reference, comparing the reference evaluation indicator and the test evaluation indicator; and a sixth step of, if it is determined in the fifth step that the test evaluation indicator is higher than the reference evaluation indicator, determining the test tennis racket with which the test evaluation indicator was obtained to be a recommended tennis racket.

In the above-described non-transitory computer-readable recording medium, a configuration is possible in which in the fifth step, if it is determined that the test evaluation indicator is lower than the reference evaluation indicator, another test tennis racket is selected.

In the above-described non-transitory computer-readable recording mediums, a configuration is possible in which a racket property that can reflect the evaluation indicator is set in advance for the reference tennis racket and the test tennis rackets, and the selection of the other test tennis racket is performed based on the racket property.

Also, in the above-described t non-transitory computer-readable recording mediums, a configuration is possible in which in the first and third steps, the reference tennis racket and the test tennis racket are swung multiple times so as to receive the input of multiple reference measured values and test measured values, and in the second and fourth steps, the reference evaluation indicator and the test evaluation indicator are calculated by obtaining averages for the evaluation indicators calculated based on the reference measured values and the test measured values.

In the above-described non-transitory computer-readable recording mediums, the reference evaluation indicator and the test evaluation indicator can be the grip velocity, the head velocity, the head velocity component, the swing trajectory of the tennis rackets, or any combination of these.

A second analyzing apparatus for tennis racket fitting according to the present invention includes:

a storage unit storing, when a tennis racket is swung at least one time by a user in order to hit a tennis ball, as a measured value, transition in at least one of the position, the velocity, the acceleration, and the angular velocity of the tennis racket measured in at least a portion of an interval from when the swing starts until when the swing ends;

a calculation unit that calculates an evaluation indicator to be an evaluation of the swing of the tennis racket based on the measured value stored in the storage unit; and a determination unit that compares a plurality of evaluation indicators calculated by the calculation unit at least one time, and presents a tennis racket for which the evaluation indicator was determined to be higher based on a predetermined reference.

According to the second analyzing apparatus of the present invention, racket evaluation indicators are calculated based on acceleration and angular velocity measured by swinging a reference tennis racket and at least one test tennis racket at least one time in order to hit a tennis ball. A test tennis racket for which a calculated evaluation indicator is higher than that of the reference tennis racket is then determined, based on a predetermined reference, to be a recommended tennis racket that is suited to the player. A determination can therefore be made based on swings that reflect the actual hitting of a ball. Also, an evaluation indicator calculated based on acceleration and angular velocity measured in swings is used to determine that a test tennis racket that obtains a higher evaluation indicator than that of the reference tennis racket is the recommended tennis racket, thus making it possible to reliably obtain a tennis racket that is suited to the player. The reference tennis racket can be the racket that the player currently uses, for example. This fitting method enables obtaining a racket that is reliably more suited to the player than the current racket is.

REFERENCE SIGNS LIST 1 measuring device
2 analyzing device
23 storage unit
2321 raw data area (second storage unit)
2324 test racket area (first storage unit)
241 calculation unit
242 indicator comparison unit (determination unit)
243 racket selection unit (determination unit)

DESCRIPTION OF EMBODIMENTS

Figure 1:
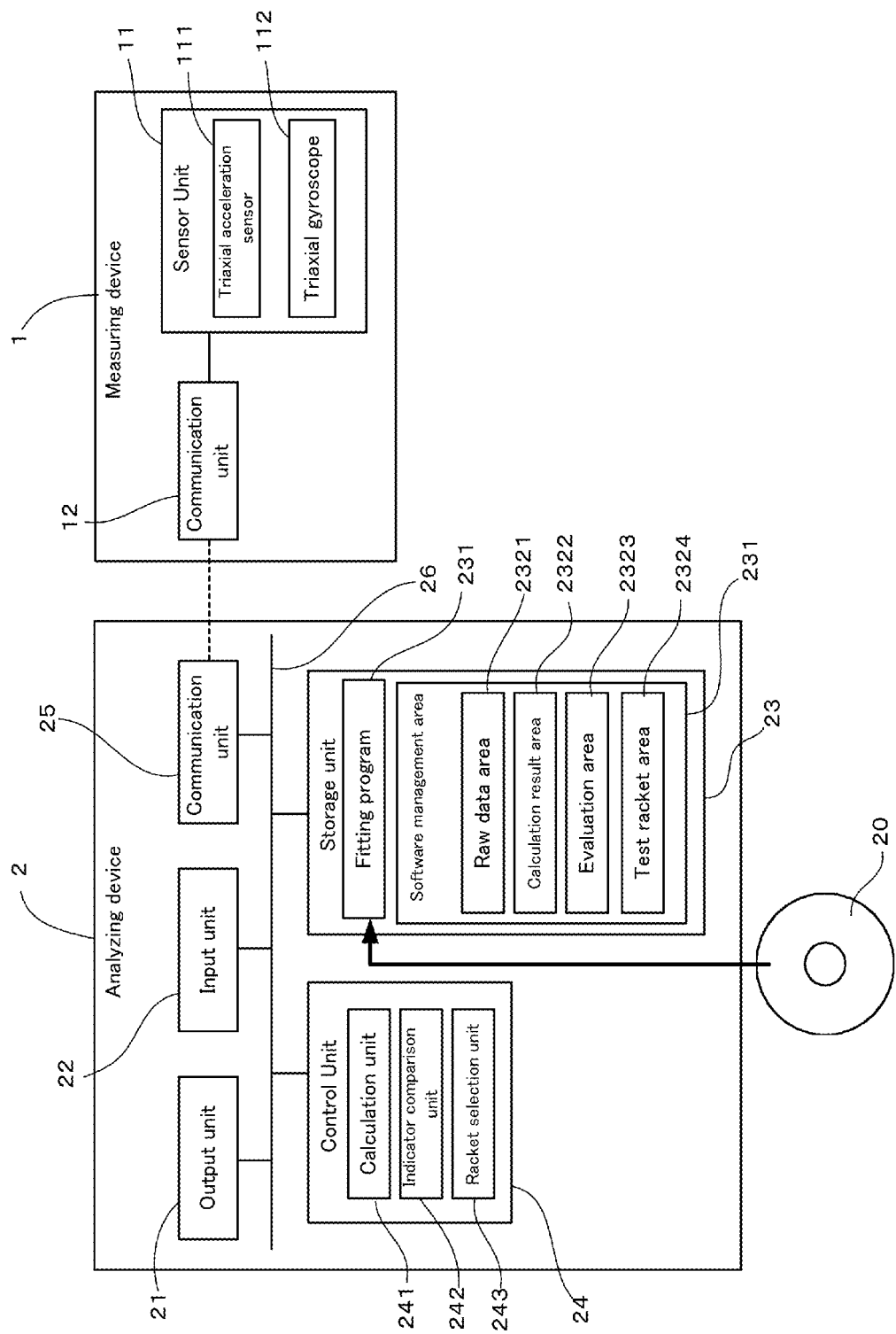
FIG. 1 is a block diagram showing a schematic configuration of a fitting system according to an embodiment of the present invention.

Hereinafter, a tennis racket fitting system according to an embodiment of the present invention will be described with reference to the drawings. FIG. 1 is a block diagram showing a schematic configuration of the fitting system.

1. Overview of Fitting System

As shown in FIG. 1, the tennis racket fitting system of the present embodiment is for evaluating tennis rackets swung by a user and selecting a tennis racket that is suited to the user, that is to say, for performing tennis racket fitting, and this tennis racket fitting system includes a measuring device 1 for performing swing measurement and an analyzing apparatus 2 for analyzing measured values sent from the measuring device 1. This device and apparatus will be described in detail below.

1-1. Measuring Device

Figure 2:
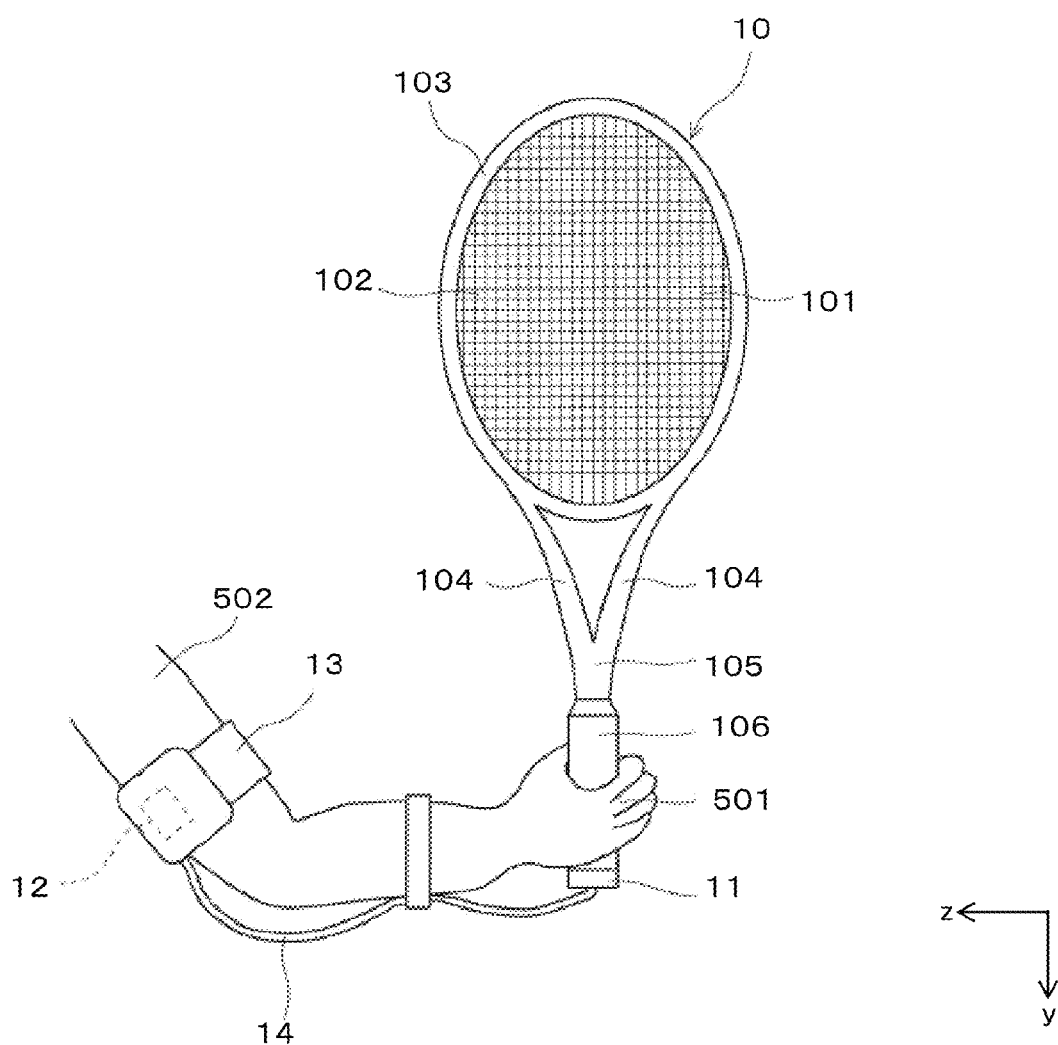
FIG. 2 is a diagram showing a schematic configuration of a measuring device.

First, the measuring device 1 will be described with reference to FIG. 2 as well. As shown in FIG. 2, the measuring device 1 includes a sensor unit 11 that is attached to a tennis racket 10, and a communication unit 12 for transmitting measurement data obtained by the sensor unit 11 to the analyzing apparatus 2. The tennis racket 10 used here is a general tennis racket that has a head 103 with a face 102 formed by a string 101 that is vertically and horizontally stretched across the head 103, and a pair of left and right throats 104 that extend from one end of the head 103 and join to a shaft 105. Also, a grip 106 that is gripped by a player (user) is joined to the shaft 105.

The sensor unit 11 of the measuring device 1 is attached to an end portion of the grip 106 so as to not hinder swing movements, and the communication unit 12 is attached to an upper arm 502 of a hand 501 that grips the grip 106 (the right hand in the example of FIG. 2). The sensor unit 11 includes a triaxial acceleration sensor 111 and a triaxial gyroscope 112 that respectively measure acceleration and angular velocity in relative coordinates (x,y,z) that are based on the racket 10. As for the relative coordinate system, the lengthwise direction of the shaft 105 of the racket 10 conforms to the y axis direction. The y axis direction is also parallel with the face 102. Also, the direction from the head 103 to the grip 106 is the positive y axis direction. The z axis direction is also parallel with the face 102, but the z axis is orthogonal to the y axis. In other words, if the face 102 shown in FIG. 2 is considered to be the face of a clock, the direction from the three o'clock position to the nine o'clock position would be the positive z axis direction. Also, although not shown in FIG. 2, the x axis direction is orthogonal to the y axis and the z axis, and is perpendicular to the face 102. In other words, the direction from the back side of the head 103 to the front side in the thickness direction is the positive x axis direction. The front side is the side that comes into contact with a tennis ball during a forehand stroke. These thus-defined x, y, and z axes are axes based on the racket 10, and the coordinates (x,y,z) defined by these axes are coordinates based on the racket 10. The x, y, and z axis directions therefore vary according to the orientation of the racket 10.

Figure 3:
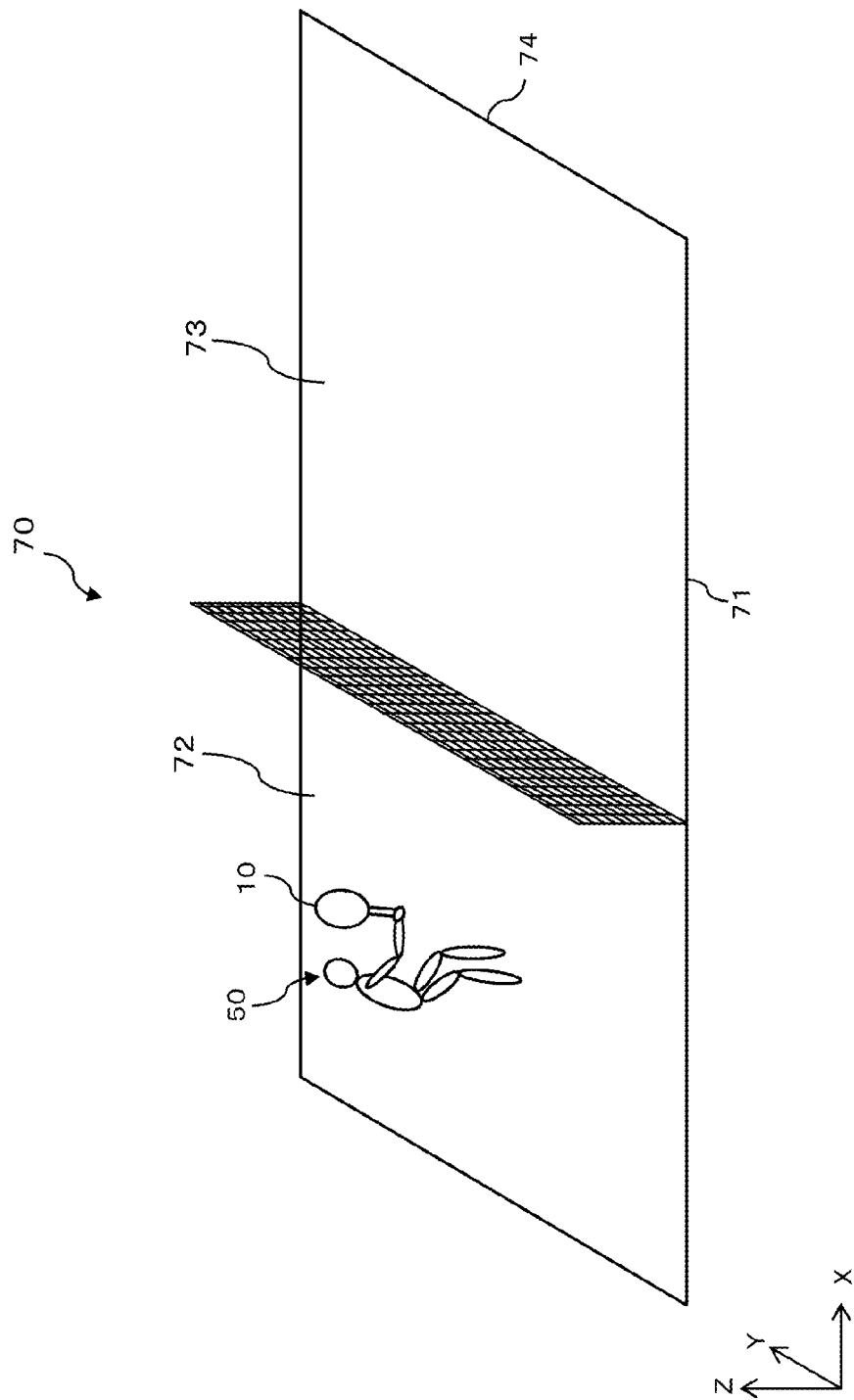
FIG. 3 is a perspective view of a tennis court.

Incidentally, in order to analyze a swing of the racket 10 for sending a ball to the opponent's side, the movement velocity and the like of the racket 10 need to be based on the ground and the space where the tennis court and the like are fixed. In other words, the movement velocity and the like of the racket should be based on absolute coordinates that are based on the ground and the space where the tennis court and the like are fixed, not on the above-described varying relative coordinates based on the racket 10 itself. For this reason, the absolute coordinate system based on the tennis court is also defined in the present embodiment. FIG. 3 is a perspective view of a tennis court 70 on which the system in FIG. 1 is used. A player 50 who performs a swing is shown in FIG. 3. This player 50 is right-handed, and is gripping the racket 10 with the right hand 501.

As shown in FIG. 3, the direction of a sideline 49 of the tennis court 46 conforms to the X axis direction. The direction from the player 48's own side 50 to an opponent's side 52 is the positive X axis direction. The direction of end lines 54 of the tennis court 46 conforms to the Y axis direction. The direction from right to left from the viewpoint of the player 48 when facing the opponent's side 52 is the positive Y axis direction. The Z axis direction is the vertical direction. The upward direction is the positive Z axis direction. These X, Y, and Z axes are axes based on the tennis court 46. In other words, these x, y, and z axes are axes based on the ground. These X, Y, and Z axes are absolute coordinate axes. Also, (X, Y, Z) coordinates defined by these axes are absolute coordinates.

Returning to FIGS. 1 and 2, the measuring device 1 will continue to be described below. As shown in FIG. 2, the communication unit 12 is fixed to the upper arm 502 by a band 13 so as to not hinder the player's swing. The sensor unit 11 and the communication unit 12 are connected by a cable 14, and thus the communication unit 12 receives data measured by the triaxial acceleration sensor 111 and the triaxial gyroscope 112 from the sensor unit 11 via the cable 14. The communication unit 12 wirelessly transmits this data to the analyzing apparatus 2, but various types of communication systems can be applied. For example, it is possible to use near field communication via the so-called BlueTooth (registered trademark) system, a UWB (Ultra Wide Band) system, a wireless LAN (Local Area Network), or the like. Note that a battery (not shown) for driving the sensor unit 11 and the communication unit 12 is also fixed to the upper arm 502 by the band 13.

1-2. Analyzing Apparatus

The following describes the analyzing apparatus 2. The analyzing apparatus 2 has an output unit 21, an input unit 22, a storage unit 23, a control unit 24, and a communication unit 25. These units are connected to each other via a bus line 26, and thus can communicate with each other. In the present embodiment, the output unit 21 can be configured by a liquid crystal display, and is for displaying a later-described screen and the like to the player and the operator of the analyzing apparatus. Also, the input unit 22 can be configured by a mouse, a keyboard, a touch panel, or the like, and is for receiving user operations performed on the analyzing apparatus 2.

The storage unit 23 is configured from a storage apparatus such as a hard disk, has a fitting program 231 stored therein, and has a software management area 232 allocated therein. The software management area 232 is an area used by the fitting program 231. A raw data area 2321, a calculation result area 2322, an evaluation area 2323, a test racket area 2324, and the like are allocated in the software management area 232. The roles of the areas 2321 to 2324 will be described later. Note that besides being storing in advance in the storage unit 23, the fitting program can be stored on a computer-readable storage medium 20 such as a magneto-optical disc, a CD-ROM, a DVD-ROM, a Blu-ray disc, or a USB memory, installed, and then executed by the control unit 24.

Also, the control unit 24 can be configured from a CPU, a ROM, a RAM, and the like. The control unit 24 virtually operates as a calculation unit 241, an indicator comparison unit 242, and a racket selection unit 243 as shown in FIG. 1 by reading out and executing the fitting program 231 stored in the storage unit 23. Operations of the units 241 to 243 will be described later.

Also, the communication unit 25 functions as an interface for receiving data from the communication unit 12 of the measuring device 1 as well as receiving data from an external storage apparatus such as a USB memory. Additionally, a printer, a plotter, and the like can be connected to the communication unit 25 as necessary.

2. Tennis Racket Fitting

Next, tennis racket fitting using the above-described measuring device 1 and analyzing apparatus 2 will be described. The fitting of the present embodiment is configured from three procedures. Specifically, the three procedures are a swing measurement procedure in which the measuring device 1 measures the acceleration and the angular velocity of the racket 10, a calculation procedure in which the analyzing apparatus 2 calculates swing evaluation indicators based on the acceleration and angular velocity that were measured, and a determination procedure for making a fitting determination based on the evaluation indicators that were calculated. These procedures will be described below in order.

2-1. Swing Measurement Procedure

Figure 4:
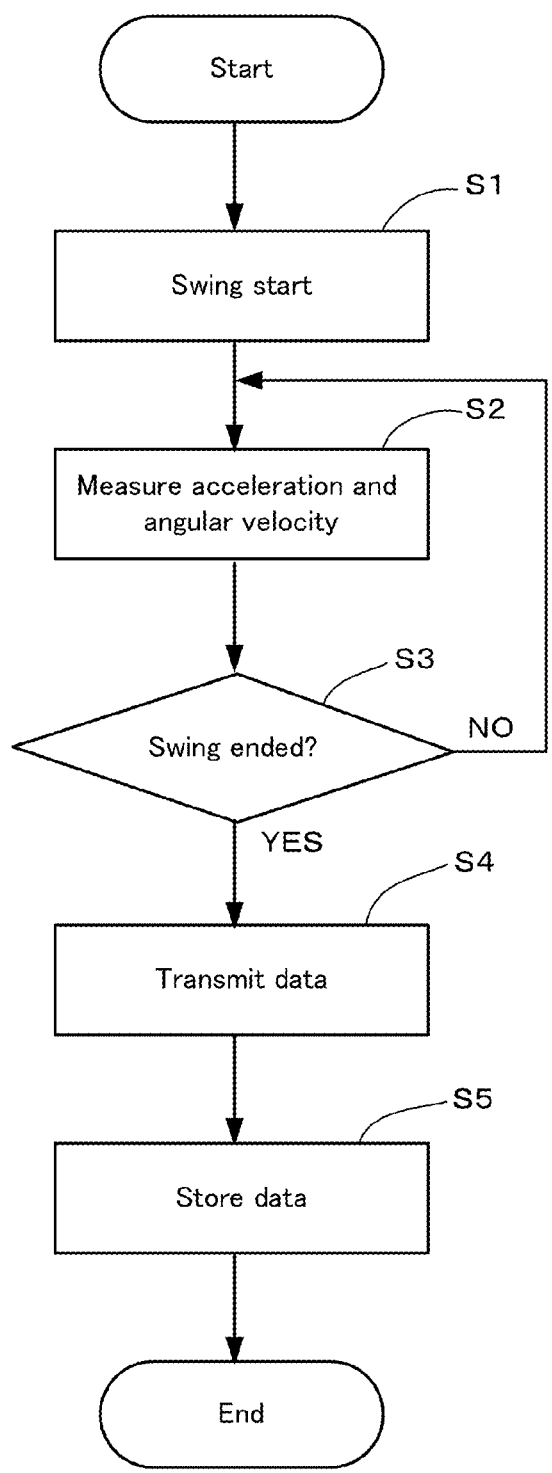
FIG. 4 is a flowchart of a measuring procedure.

FIG. 4 is a flowchart showing an example of the swing measurement procedure. First, a start button or the like is pressed using the input unit 22 of the analyzing apparatus 2, and the player 50 starts to swing the racket 10 (step S1). This swing is a swing for hitting a tennis ball, not a so-called practice swing. For example, when a tennis ball is supplied to the player 50 on his own side 72 in a constant direction and at a constant velocity by a ball supplying apparatus, the player 50 endeavors to hit the tennis ball back to the opponent's side 73. This swing is assumed to be a right-handed forehand groundstroke. A groundstroke is when a tennis ball that has bounced off the ground of the tennis court one time is hit. If the hit tennis ball does not fall on the opponent's side 73, that swing is not subjected to subsequent analysis. Even if the hit tennis ball falls on the opponent's side 73, that swing is not subjected to subsequent analysis if it was clearly a mishit.

While the swing is being performed, the triaxial acceleration sensor 111 and the triaxial gyroscope 112 respectively measure the acceleration and angular velocity per time instant (step S2). More specifically, the triaxial acceleration sensor 111 measures grip accelerations $A(gx)$, $A(gy)$, and $A(gz)$ in the relative x axis direction, the relative y axis direction, and the relative z axis direction at a predetermined sampling interval. Also, the triaxial gyroscope 112 measures grip angular velocities $\omega(gx)$, $\omega(gy)$, and $\omega(gz)$ about the relative x axis, about the relative y axis, and about the relative z axis at a certain time interval. Although there are no particular limitations on the predetermined sampling interval, data can be obtained every $\frac{1}{1000}$ to $\frac{1}{500}$ sec, for example. When the swing ends (YES in step S3), measurement is ended. Although this swing can be performed any number of times, it is preferable that three to ten swings are measured in consideration of the number of swings required for swing stabilization. Data indicating the grip accelerations $A(gx)$, $A(gy)$, and $A(gz)$ and the grip angular velocities $\omega(gx)$, $\omega(gy)$, and $\omega(gz)$ that were measured is then transmitted from the communication unit 12 to the communication unit 25 of the analyzing apparatus 2 (step S4). The transmitted data is then stored in the raw data area 2321 of the storage unit 23 by the control unit 24 (step S5). Measurement can be ended by operating the input unit 22 from the analyzing apparatus 2, for example. At this time, measurement data can be transmitted in real-time at the same time as measurement.

2-1. Evaluation Indicator Calculation Procedure

Next, the calculation unit 241 of the control unit 24 calculates swing evaluation indicators using part or all of the data indicating the grip accelerations $A(gx)$, $A(gy)$, and $A(gz)$ and the grip angular velocities $\omega(gx)$, $\omega(gy)$, and $\omega(gz)$ stored in the raw data area 2321 of the storage unit 23 (step S21). Examples of the evaluation indicators include the grip acceleration, the grip velocity, the head velocity, the head acceleration, the head velocity component ratio, the swing trajectory, and the racket angular velocity.

When calculating these evaluation indicators, an issue arises regarding the time of the data that is to be used, that is to say, the time between the start and the end of the swing. Specifically, data indicating the grip accelerations $A(gx)$, $A(gy)$, and $A(gz)$ and the grip angular velocities $\omega(gx)$, $\omega(gy)$, and $\omega(gz)$ per time instant is obtained, and data at the time instant that is suited to making a matching determination between the player 50 and the racket 10 is selected from among the data. Here, one example of a time instant that is suited to making a matching determination is, in the case of using the head velocity, the time instant when the head velocity is the highest. The head velocity gradually rises from when the swing starts, and then the head 103 rapidly decelerates upon impact with the tennis ball. The time instant immediately before this deceleration is the time instant at which the head velocity is the highest. The above-described evaluation indicators, including the head velocity, will be described below.

Head Velocity

The head velocity is calculated based on data indicating the grip accelerations $A(gx)$, $A(gy)$, and $A(gz)$ per time instant for the relative coordinate axes x, y, and z, data indicating the grip angular velocities $\omega(gx)$, $\omega(gy)$, and $\omega(gz)$ per time instant for the relative coordinate axes x, y, and z, and the racket length. First, the calculation unit 241 calculates the grip velocities $V(gX)$, $V(gY)$, and $V(gZ)$ per time instant in the XYZ absolute coordinate system using the above-described mathematical expressions. The calculation unit 241 then calculates a rotation matrix RM using the above-described quaternions. The calculation unit 241 furthermore calculates a velocity vector Vr from rotation per time instant in the XYZ absolute coordinate system based on the following mathematical expression.

$$Vr = \text{cross}(\omega, tV) * RM$$

In this mathematical expression, cross(ω,tV) is the exterior product of the angular velocity vector ω per time instant for the relative coordinate axes x, y, and z and the racket length vector tV.

The calculation unit 241 calculates the head velocities V(hX), V(hY), and V(hZ) per time instant for the absolute coordinate axes X, Y, and Z using the following mathematical expressions.

$$V(hX)=V(gX)+Vr(X)$$

$$V(hY)=V(gY)+Vr(Y)$$

$$V(hZ)=V(gZ)+Vr(Z)$$

Next, the calculation unit 241 calculates the magnitude V(h) of the head velocity per time instant in the XYZ absolute coordinate system based on the head velocities V(hX), V(hY), and V(hZ) per time instant in the XYZ absolute coordinate system.

This calculation is performed based on the following mathematical expression.

$$V(h)=\mathrm{SQRT}(V(hX)^2+V(hY)^2+V(hZ)^2)$$

The head velocities V(h) per time instant are stored in the calculation result area 2322.

From among the magnitudes V(h) of the head velocity per time instant, the calculation unit 241 then selects the magnitude V(h) at the time instant immediately before impact (immediately before deceleration) as the highest head velocity VV(h). The calculation unit 241 then stores the head velocities V(hX), V(hY), and V(hZ) per time instant, the magnitudes V(h) of the head velocity per time instant, and the highest head velocity VV(h) in the evaluation area 2322 as evaluation indicators. Note that the head velocity gradually increases from when the swing movement starts, and then rapidly decreases upon impact between the tennis racket 10 and the tennis ball. Accordingly, the time instant at which the highest head velocity V(h) is obtained is the time instant immediately before impact, which is thought to be the time instant that is suited to determining compatibility between the player 50 and the racket 10. Note that although the head velocities in the absolute coordinate system are calculated based on the measured values of the grip velocity and the grip angular velocity in the relative coordinate system, a configuration is possible in which the sensor unit 11 is attached to the tip of the head 103 and measures head acceleration in the relative coordinate system, and the head velocity in the absolute coordinate system is obtained based on values obtained by converting the head acceleration into the absolute coordinate system.

Head Acceleration

The head acceleration in the XYZ absolute coordinate system is calculated based on the head velocities V(hX), V(hY), and V(hZ) in the XYZ absolute coordinate system. More specifically, the calculation unit 241 calculates A(hX), A(hY), and A(hZ), which are the X-axis, Y-axis, and Z-axis components of the head acceleration per time instant, by performing temporal differentiation on V(hX), V(hY), and V(hZ), which are the X-axis, Y-axis, and Z-axis components of the head velocity per time instant.

Next, the calculation unit 241 calculates the magnitude A(h) of the head acceleration per time instant in the XYZ absolute coordinate system based on the head accelerations A(hX), A(hY), and A(hZ) per time instant in the XYZ absolute coordinate system. This calculation is performed based on the following mathematical expression.

$$A(h)=\mathrm{SQRT}(A(h(hX)^2+A(hY)^2+A(hZ)^2)$$

From among the magnitudes A(h) of the head acceleration per time instant, the calculation unit 241 then selects the magnitude A(h) at the time instant immediately before impact (immediately before deceleration) as the highest head acceleration AA(h). The calculation unit 241 then stores the head accelerations A(hX), A(hY), and A(hZ) per time instant, the magnitudes A(h) of the head acceleration per time instant, and the highest head acceleration AA(h) in the evaluation area 2322 as evaluation indicators. Note that although the head acceleration in the absolute coordinate system is calculated based on the measured values of the grip velocity and the grip angular velocity in the relative coordinate system, a configuration is possible in which the sensor unit 11 is attached to the tip of the head 103 and measures head acceleration in the relative coordinate system, and this head acceleration is converted into the absolute coordinate system.

Head Velocity Component Ratio

The head velocity component ratio I in the XYZ absolute coordinate system is calculated based on data indicating the grip accelerations A(gx), A(gy), and A(gz) in the xyz relative coordinate system, the grip angular velocities ω(gx), ω(gy), and ω(gz) in the xyz relative coordinate axis system, and the racket length. Specifically, first, the calculation unit 241 calculates V(hX) and V(hZ), which are the X-axis and Z-axis components of the head velocity per time instant in the XYZ absolute coordinate system using the previously-described mathematical expressions. Next, the calculation unit 241 calculates the head velocity component ratio I per time instant in the XYZ absolute coordinate system based on the following mathematical expression.

$$I=V(hZ)/V(hX)$$

From among the head velocity component ratios I per time instant, the calculation unit 241 then selects the head velocity component ratio I at the time instant immediately before impact (immediately before deceleration) as the highest head velocity component ratio II. The calculation unit 241 then stores the head velocity component ratios I per time instant and the highest head velocity component ratio II in the evaluation area 2322 as evaluation indicators. Note that although the head velocity component ratios are calculated based on the measured values of the grip velocity and the grip angular velocity in the relative coordinate system, a configuration is possible in which the sensor unit 11 is attached to the tip of the head 103 and measures head acceleration in the relative coordinate system, and the head velocity component ratio I is obtained based on values obtained by converting the head acceleration into the absolute coordinate system.

Grip Velocity

The grip velocity in the XYZ absolute coordinate system is calculated based on the data indicating the grip accelerations A(gX), A(gY), and A(gZ) in the XYZ absolute coordinate system. More specifically, the calculation unit 241 calculates V(gX), V(gY), and V(gZ), which are the X-axis, Y-axis, and Z-axis components of the grip velocities per time instant, based on the following mathematical expressions.

$$\Delta V(gX)=A(gX)*\Delta T$$

$$\Delta V(gY)=A(gY)*\Delta T$$

$$\Delta V(gZ)=A(gZ)*\Delta T$$

In the above mathematical expressions, ΔT indicates a micro time (the above-described sampling interval), and ΔV(gX), ΔV(gY), and ΔV(gZ) indicate the amount of increase in V(gX), V(gY), and V(gZ) in the micro time 4T. The value of ΔT is appropriately input to the analyzing apparatus 2 by the operator.

Next, the calculation unit 241 calculates the magnitude of the grip velocity V(g) per time instant in the XYZ absolute coordinate based on the grip velocities V(gX), V(gY), and V(gZ) per time instant in the XYZ absolute coordinate system. This calculation is performed based on the following mathematical expression.

$$V(g)=SQRT(V(gX)^2+V(gY)^2+V(gZ)^2)$$

Then, from among the magnitudes V(g) of the grip velocity per time instant, the calculation unit 241 selects the magnitude V (g) at the time instant immediately before impact (immediately before deceleration) as the highest grip velocity VV(g). The calculation unit 241 then stores the grip velocities V(gX), V(gY), and V(gZ) per time instant, the magnitudes V(g) of the grip velocity per time instant, and the highest grip velocity VV(g) in the evaluation area 2322 as evaluation indicators. If the highest grip velocity VV(g) is high, it means that the player 50 has little arm strain and hand looseness. Also, if the highest grip velocity VV(g) is high, it means that that racket 10 is a good match for the player 50.

Grip Acceleration

The grip acceleration in the XYZ absolute coordinate system is calculated based on the data indicating the grip accelerations A(gx), A(gy), and A(gz) in the xyz relative coordinate system and the grip angular velocities ω(gx), ω(gy), and ω(gz) in the xyz relative coordinate system. More specifically, the calculation unit 241 converts the grip accelerations A(gx), A(gy), and A(gz) per time instant into A(gX), A(gY), and A(gZ), which are the X-axis, Y-axis, and Z-axis components of the grip accelerations per time instant, based on the grip angular velocities ω(gx), ω(gy), and ω(gz) per time instant. The quaternions used in this conversion are expressed by the following mathematical expressions.

$$Q=[\cos(θ);ω(gx)/θ*\sin(θ/2),ω(gy)/θ*\sin(θ/2),ω(gz)/θ*\sin(θ/2)]$$

$$R=[\cos(θ);-ω(gx)/θ*\sin(θ/2),-ω(gy)/θ*\sin(θ/2),-ω(gz)/θ*\sin(θ/2)]$$

The value of θ in these mathematical expressions is obtained by the following mathematical expression.

$$θ=SQRT(ω(gx)^2+ω(gy)^2+ω(gz)^2)$$

Next, the calculation unit 241 calculates the magnitude A(g) of the grip acceleration per time instant in the XYZ absolute coordinate system based on the grip accelerations A(gX), A(gY), and A(gZ) per time instant in the XYZ absolute coordinate system. This calculation is performed based on the following mathematical expression.

$$A(g)=SQRT(A(gx)^2+A(gy)^2+A(gz)^2)$$

Then, from among the magnitudes A(g) of the grip acceleration per time instant, the calculation unit 241 selects the magnitude A(g) at the time instant immediately before impact (immediately before deceleration) as the highest grip acceleration AA(g). The calculation unit 241 then stores the grip accelerations A(gX), A(gY), and A(gZ) per time instant, the magnitudes A(g) of the grip acceleration per time instant, and the highest grip acceleration AA (g) in the evaluation area 2322 as evaluation indicators. If the highest grip acceleration AA(g) is high, it means that the player 50 has little arm strain and hand looseness, and that the player 50 can forcefully hit the tennis ball. Also, if the highest grip acceleration AA(g) is high, it means that that racket 10 is a good match for the player 50.

Swing Trajectory

The swing trajectory in the XYZ absolute coordinate system is calculated based on data indicating the grip accelerations A(gx), A(gy), and A(gz) in the xyz relative coordinate system, the grip angular velocities ω(gx), ω(gy), and ω(gz) in the xyz relative coordinate axis system, and the racket length. Specifically, first, the calculation unit 241 calculates the grip velocities V(gX), V(gY), and V(gZ) per time instant in the XYZ absolute coordinate system using the above-described mathematical expressions. Next, the calculation unit 241 calculates P(gX), P(gY), and P(gZ), which are the X-axis, Y-axis, and Z-axis components of the position of the grip 106 per time instant, based on the grip velocities V(gX), V(gY), and V(gZ) using the following mathematical expressions.

$$ΔP(gX)=V(gX)*ΔT$$

$$ΔP(gY)=V(gY)*ΔT$$

$$ΔP(gZ)=V(gZ)*ΔT$$

In the above mathematical expressions, ΔT indicates a micro time (the above-described sampling interval), and ΔP(gX), ΔP(gY), and ΔP(gZ) indicate the amount of increase in P(gX), P(gY), and P(gZ) in the micro time ΔT.

The calculation unit 241 also calculates a relative position P(h) of the top of the head 103 per time instant with respect to the grip 106 using the following mathematical expression.

$$P(h)=tV*RM$$

In this mathematical expression, tV is the above-described racket length vector, and RM is the above-described rotation matrix. The calculation unit 241 calculates the absolute coordinates (Xt,Yt,Zt) of the top of the head 103 per time instant using the following mathematical expression, and stores them in the evaluation area 2322 as an evaluation indicator. The absolute coordinates (Xt,Yt,Zt) per time instant refers to the trajectory of the racket 10.

$$(Xt,Yt,Zt)=P(g)+P(h)$$

The calculation unit 241 calculates the movement distance $J_X$ of the head 103 in the absolute coordinate axis X direction from times to to t using the following mathematical expression.

$$J_X=(Xt-Xto)$$

The calculation unit 241 calculates the movement distance Jy of the head 103 in the absolute coordinate axis Y direction from times to to t using the following mathematical expression.

$$J_Y=(Yt-Yto)$$

The movement distances $J_X$ and $J_Y$ are stored as evaluation indicators in the evaluation area 2322.

Movement distances $J_X$ and $J_Y$ in various time zones can be calculated. For example, the movement distances $J_X$ and $J_Y$ from t seconds before impact to impact can be calculated. Also, the movement distances $J_X$ and $J_Y$ from impact to t seconds after impact can be calculated.

The trajectory of the racket 10 is revealed using the movement distances $J_X$ and $J_Y$. Whether that racket 10 is suited to the player 50 can be determined based on this trajectory. For example, it is possible to set an ideal trajectory in advance and determine that a racket 10 whose trajectory is close to the ideal trajectory is a racket that is a good match for the player 50. As one example of an ideal trajectory, when a racket that is a good match for the player is swung, the racket is greatly swung forward, the upswing angle is small, and so on.

Since this swing trajectory can be calculated based on the grip velocity, the triaxial acceleration sensor 111 and the triaxial gyroscope 112 do not need to be attached to the head 103.

Racket Angular Velocity

The racket angular velocity in the xyz relative coordinate system is the grip angular velocity ω(gy) about the y axis, which is a measured value obtained by the triaxial gyroscope 112.

Figure 5:
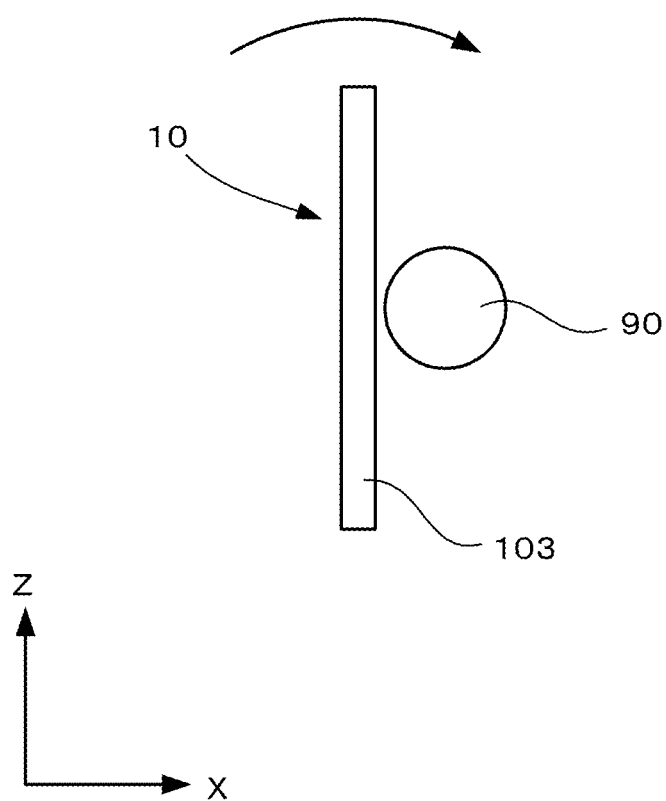
FIG. 5 is a front view of a tennis racket used in the measurement of racket angular velocity, along with a tennis ball.

FIG. 5 shows the tennis racket 10 in the sampling procedure. FIG. 5 shows the head 103 when viewed along the relative coordinate axis y direction. FIG. 5 also shows a tennis ball 90 immediately before impact with the racket 10. An arrow A in this figure shows the rotation direction of the head 103. The angular velocity of this rotation is the above-described grip angular velocity ω(gy). Accordingly the grip angular velocity ω(gy) per time instant is stored in the evaluation area 2322 as the racket angular velocity per time instant, which is an evaluation indicator. Then, from among the grip angular velocities ω(gy) per time instant, the calculation unit 241 selects the grip angular velocity ω(gy) at the time instant immediately before impact (immediately before deceleration) as the highest grip angular velocities ωω, and stores it in the evaluation area 2322 as an evaluation indicator.

If the grip angular velocity ω(gy) has a positive value, it means that the swing is of the swing type in which the tennis ball 90 is hit while the face 102 is closed. If the grip angular velocity ω(gy) has a negative value, it means that the swing is of the swing type in which the tennis ball 90 is hit while the face 102 is open. For example, if the grip angular velocity is relatively high, it can be determined that that racket is not a good match since there is a large amount of control of the surface. Alternatively, if there is a large amount of variation in the grip angular velocity when multiple swings are performed, it can be determined that that racket is not a good match since control of the surface is not constant. The player 50 can thus select a racket 10 that is suited to his type of swing.

Note that although the above-described evaluation indicators can be calculated based on one measured value, a configuration is possible in which, for example, multiple swings are performed, multiple evaluation indicators are calculated based on the measured values of the swings, and the average of those evaluation indicators is used as the evaluation indicator. In this case, the average value is calculated by the calculation unit 241.

2-3. Fitting Determination Procedure

Figure 6:
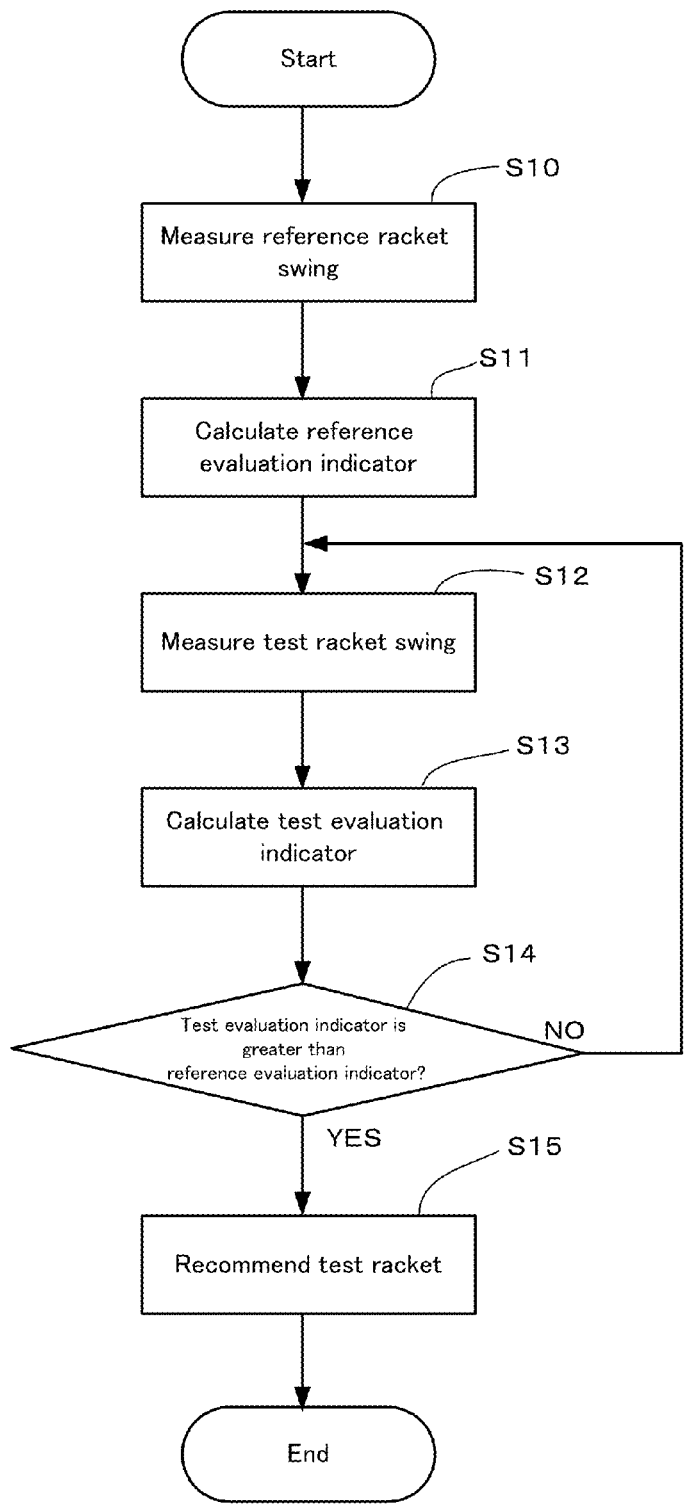
FIG. 6 is a flowchart of a fitting procedure.

Next, the determination procedure leading to racket selection, including the two previous procedures, will be described with reference to FIG. 6. FIG. 6 is a flowchart showing the fitting determination procedure. First, a reference tennis racket that is to be the evaluation reference is prepared. This tennis racket can be the player's own tennis racket, for example. Next, in accordance with the two above-described procedures, this tennis racket is used in the measurement of acceleration and angular velocity (step S10), and the above-described evaluation indicators are calculated by the calculation unit 241 based on the measured acceleration and angular velocity (step S11). Any of the above-described evaluation indicators may used, all of the evaluation indicators may used, or several of them can be used. These thus-calculated evaluation indicators of the reference tennis racket will be referred to hereinafter as reference evaluation indicators. Next, a test tennis racket for fitting is prepared, measurement is performed using the test tennis racket (step S12), and an evaluation indicator is calculated based on the measured values (step S13). This measured value will be referred to as a test evaluation indicator. The reference evaluation indicator and the test evaluation indicator are stored in the evaluation area 2323 of the storage unit. Next, the indicator comparison unit 2323 compares the reference evaluation indicator and the test evaluation indicator stored in the evaluation area 2323, determines that the test tennis racket is a recommended tennis racket if the test evaluation indicator is greater (YES in step S14), and outputs the determination result to the output unit 21 (step S15). There are no particular limitations on the output method, and examples include display on a display, output by a printer, and the like. As described above, the higher the evaluation indicators related to velocity and acceleration are, the better the match for the player can be said to be, and therefore it can be determined that a racket whose evaluation indicators are greater than those of the player's own racket is determined to be a racket that is a better match for the player. Details regarding the case of other evaluation indicators have already be described.

On the other hand, if the reference evaluation indicator is greater (NO in step S14), another test tennis racket is selected, swing measurement is performed using that test tennis racket and an evaluation indicator is calculated, and this is repeated until the test evaluation indicator is greater than the reference evaluation indicator. It should be noted that a configuration is possible in which even if the reference evaluation indicator is lower, fitting is not ended at that point, but rather another test tennis racket is tried in order to find an even better test tennis racket.

3. Racket Selection

Incidentally, although a test tennis racket is selected in the above-described fitting determination procedure, this selection can be performed using various methods. For example, prepared rackets may be tried in order, but efficiency is a problem in this case. In view of this, it is possible to set the racket properties of the test tennis rackets and perform racket selection based on the racket properties, in consideration of the evaluation indicators. This technique will be described below.

3-1. Racket Properties

There are various examples of racket properties that influence swing, some of which are "power", "ball grip", and "impact shock". It should be noted that other racket properties can also be examined. Here, "power" is a racket property indicating the suitability of repelling force and flight distance, and "ball grip" is a racket property indicating the suitability of the timing of ball release. Also, "impact shock" is a racket property indicating the suitability of the sensed hitting weight and sense of impact. A player is known to be influenced in the following ways when these racket properties are raised and lowered.

TABLE 1

| Property | Element magnitude | Pattern of typical change in player swing |
|---|---|---|
| Power | Raised | Keep in court by increasing upswing to apply spin |
| | | Keep in court by decrease swing speed |
| | Lowered | Hit far forward by reducing upswing and swinging in hitting direction |
| | | Hit far by increasing swing speed |

TABLE 1-continued

| Property | Element magnitude | Pattern of typical change in player swing |
|---|---|---|
| Ball grip | Raised | Swing in hitting direction since ball gets lift even without upswing |
| | Lowered | Increase upswing since ball gets no lift without upswing |
| Impact shock | Raised | Lower swing speed to lessen hit ball weight and sense of impact shock |
| | | Decrease upswing and contact to lessen hit ball weight and sense of impact shock |
| | Lowered | Increase impact and swing speed since hit ball weight and sense of impact shock are low |
| | | Increase contact and swing forward since hit ball weight and sense of impact shock are low |

In view of this, quantifying these racket properties allows the racket characteristics to be expressed easily, and therefore it is conceivable to be able to efficiently select a racket. Here, three index values obtained by quantifying the racket properties are set as described below, giving consideration to the characteristics of the racket properties. These index values are set using the racket specifications.

(1) Power Index Value $$\frac{(\text{Face area})^2 \times ((\text{Max thickness} + \text{Min thickness})/2) \times (\text{Flex}) \times (\text{Length})}{((\text{No. of main strings}) \times (\text{No. of cross strings}))} \quad \text{Expression 1}$$

The power index value is obtained by quantifying the racket property indicating the suitability of repelling force and flight distance, and among the racket specifications, those that positively influence power are set as the numerator, and those that negatively influence power are set as the denominator. Also, "face area", which particularly influences power, is squared so as to increase its influence.

(2) Ball Grip Index Value $$\frac{(\text{Face area})}{(\text{Min thickness}) \times (\text{Flex})^2 \times (\text{No. of main strings}) \times (\text{No. of cross strings})} \quad \text{Expression 2}$$

The ball grip index value is obtained by quantifying the racket property indicating the suitability of the timing of ball release, and among the racket specifications, those that positively influence ball grip are set as the numerator, and those that negatively influence ball grip are set as the denominator. Also, "flex", which particularly negatively influences ball grip, is squared so as to increase its influence.

(3) Impact Shock Index Value $$\frac{(\text{No. of main strings}) \times (\text{No. of cross strings})}{(\text{Face area}) \times (\text{Max thickness})^2 \times (\text{Flex})} \quad \text{Expression 3}$$

The impact shock index value is obtained by quantifying the racket property indicating the suitability of the hitting weight and sense of impact, and among the racket specifications, those that positively influence impact shock are set as the numerator, and those that negatively influence response are set as the denominator. Also, "max thickness", which particularly negatively influences impact shock, is squared so as to increase its influence.

Although numerical values calculated based on the above-described expressions can be used as these index values, the numerical values rise too high when used directly, and it becomes difficult to use them as determination criteria; it is therefore possible to, for example, multiply the numerical values calculated based on the expressions by a correction coefficient and consider them to be relative numerical values based on the numerical values for certain rackets. Also, the above-described setting of the index values is merely one example, and needless to say, the index values can be set using other mathematical expressions.

Next, the correlation between these index values and actual hits will be examined, and the effectiveness of the three racket properties set here will be examined. First, the following nine types of tennis rackets are prepared. Note that Revox 4.0 is used as the reference for the index values, and the index values are relative values assuming the value of 10 for Revox 4.0.

TABLE 2

| Racket | Weight (g) | Balance (g) | Face area (sqin) | Thickness (mm) | Length (inch) | Flex (RA value) | Strings (No.) | Power (Points) | Ball grip (Points) | Impact shock (Points) |
|---|---|---|---|---|---|---|---|---|---|---|
| Revox 4.0 | 310 | 315 | 98 | 21-20 | 27 | 69 | 16 × 19 | 10 | 10 | 10 |
| Revox 2.0 | 290 | 325 | 100 | 24 | 27 | 69 | 16 × 19 | 8.2 | 11.8 | 13.3 |
| Revox 2.0 Tour | 320 | 305 | 95 | 20-19 | 27 | 65 | 16 × 19 | 6.9 | 13.5 | 16.1 |
| Revov 3.0 | 300 | 320 | 100 | 26-21 | 27 | 69 | 16 × 19 | 9.8 | 11.4 | 8.5 |
| Revov 5.0 | 280 | 335 | 102 | 26.5-19 | 27 | 68 | 16 × 19 | 9.8 | 13.3 | 8.2 |
| Neomax 2000 | 320 | 305 | 98 | 22 | 27.25 | 69 | 16 × 19 | 8.8 | 10.7 | 12.1 |
| Neomax 3000 | 285 | 340 | 106 | 23 | 27 | 68 | 16 × 19 | 10.6 | 11.4 | 10.4 |
| Dcnex 8.0 | 255 | 355 | 110 | 27-26 | 27.5 | 77 | 16 × 18 | 16.0 | 8.6 | 6.1 |
| Dcnex 10.0 | 255 | 360 | 115 | 28-26 | 27.5 | 77 | 16 × 18 | 17.9 | 9.0 | 5.4 |

Actual power, ball grip, and impact shock were obtained through sensory evaluation by twenty players that made actual hits using these rackets. The twenty players hit rallies with stroke swings and evaluated each racket characteristic according to five levels (five points being the best value), and actual hit properties were calculated by averaging the evaluated values. The results are shown in Table 3 below and FIG. 7.

TABLE 3

| | Actual power points | Actual ball grip points | Actual impact shock points |
|---|---|---|---|
| Revox 4.0 | 3.5 | 3.5 | 3 |
| Revox 2.0 | 2.5 | 4 | 4 |
| Revox 2.0 Tour | 1.5 | 4.5 | 4.5 |

TABLE 3-continued

|  | Actual power points | Actual ball grip points | Actual impact shock points |
|---|---|---|---|
| Revov 3.0 | 3 | 3.5 | 3 |
| Revov 5.0 | 3.5 | 4.5 | 3 |
| Neomax 2000 | 2.5 | 3.5 | 3.5 |
| Neomax 3000 | 4 | 4 | 2.5 |
| Dcnex 8.0 | 4.5 | 2.5 | 1.5 |
| Dcnex 10.0 | 5 | 3 | 1 |

Figure 7:
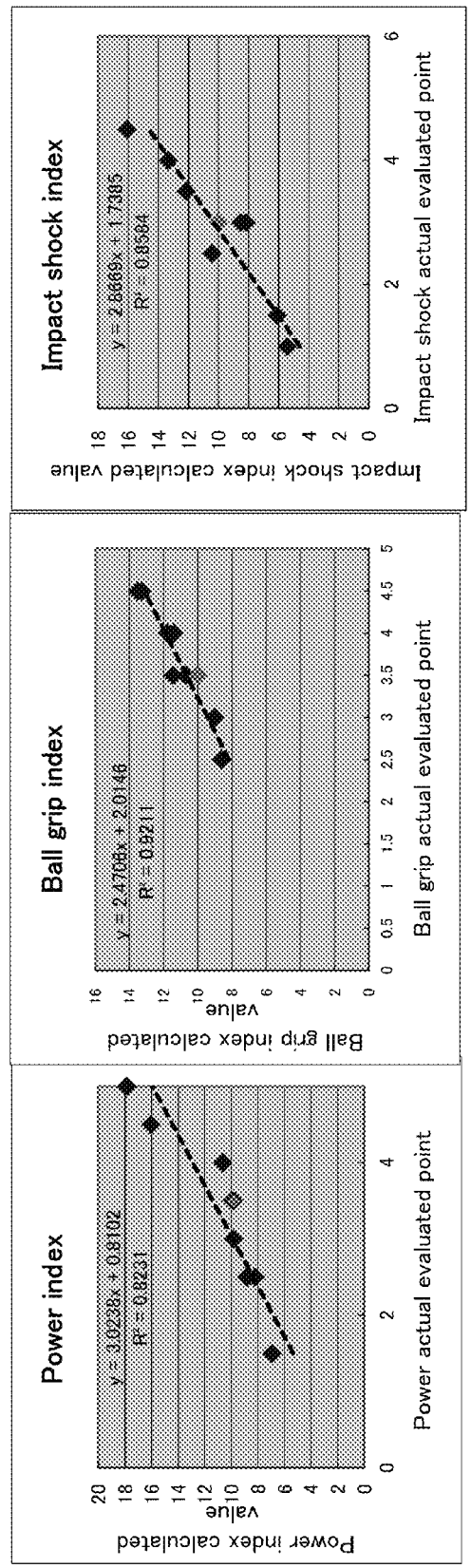
FIG. 7 is a correlation diagram showing the relationship between racket properties and actual hits.

According to the graphs of FIG. 7, the index values and actual hit points have a correlation coefficient of 0.8 or greater for all of the racket properties, and it was found that the racket property index values are effective. Note that the racket property index values shown in Table 2 are stored in the test racket area 2324 of the storage unit 23 of the analyzing apparatus 2.

3-2. Fitting Using Racket Properties

Figure 8:
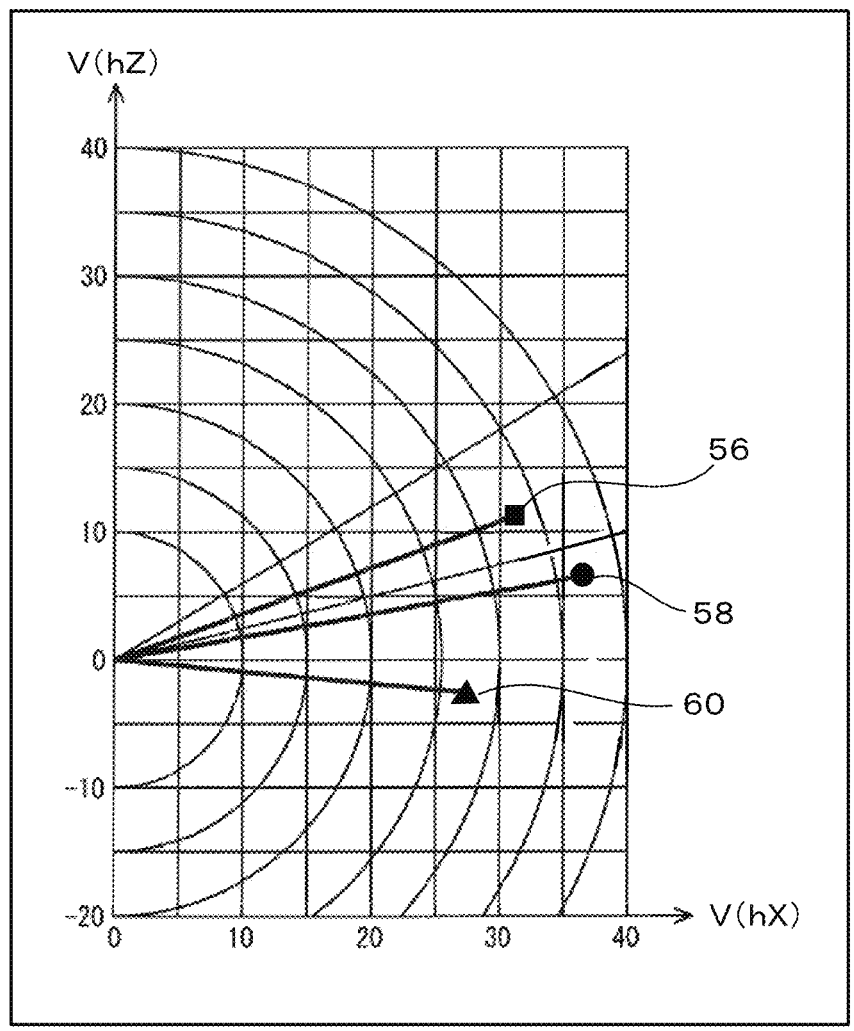
FIG. 8 is a graph shown by an output unit.

Next, racket fitting is performed using the above-described racket properties. Here, fitting is performed using head velocity as the evaluation indicator. More specifically, the evaluation indicator is output to a graph as shown in FIG. 8, and evaluation is performed. In this graph, the horizontal axis indicates the head velocity V(hX) in the X axis direction at the time instant at which the head velocity V(h) is the highest, that is to say, indicates the flat velocity component. The vertical axis indicates the head velocity V(hZ) in the Z axis direction at the time instant at which the head velocity V(h) is the highest, that is to say, indicates the spin velocity component. A distance L from the origin (0,0) to a point (V(hX),V(hZ)) on the graph is calculated using the following mathematical expression.

$$L = \text{SQRT}(V(hx)^2 + V(hz)^2)$$

This distance L is a head velocity V' (h) when it is assumed that the head velocity V(hy) in the y axis direction is zero. Many arcs are drawn in FIG. 8, and the center of each arc is the origin (0,0). The radius of each arc indicates the head velocity V' (h).

A first point 56, a second point 58, and a third point 60 are shown in FIG. 8. The first point 56 is indicated by a filled square. The second point 58 is indicated by a filled circle. The third point 60 is indicated by a filled triangle. The first point 56 indicates the point (V(hX),V(hZ)) at which a first racket was swung. The second point 58 indicates the point (V(hX),V(hZ)) at which a second racket was swung. The third point 60 indicates the point (V(hX),V(hZ)) at which a third racket was swung. Two examples of fitting will be described below using this graph. Note that the evaluation indicator is calculated by obtaining an average over five swings for each racket.

Figure 9:
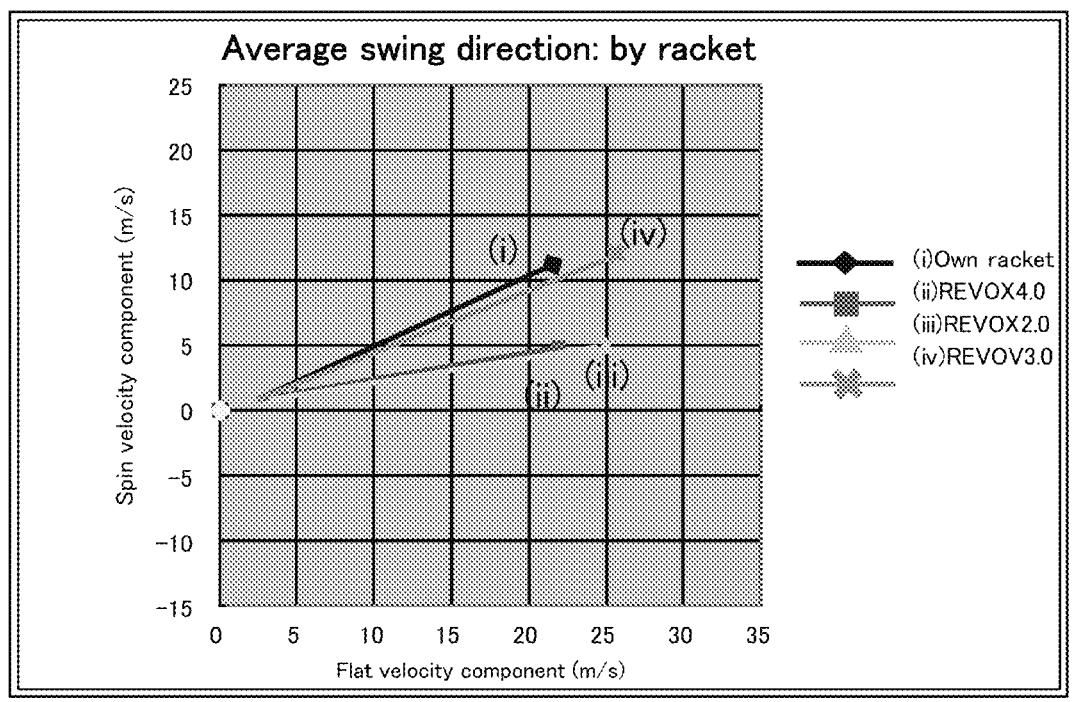
FIG. 9 is a graph showing an example of fitting.

The first fitting example is shown in FIG. 9. First, the player swings his own racket, and a reference evaluation indicator is calculated. This player is a male advanced tennis player. The reference evaluation indicator calculated here is the straight line indicated by (i) in FIG. 9. Next, swings are performed using Revox 4.0 as the test tennis racket, and a test evaluation indicator is calculated. This result is the straight line indicated by (ii) in FIG. 9. A comparison of these indicators shows that the flat velocity component and the spin velocity component both decreased for the racket in the case of (ii) compared to (i). In other words, it is thought that the racket swing speed decreased due to "power" being too good. In view of this, consideration is given to trying a racket with a lower index value for the racket property "power".

Here, after the calculation unit 241 of the control unit 24 of the analyzing apparatus 2 has calculated evaluation indicators, the indicator comparison unit 242 compares the two evaluation indicators. Then by referencing Table 2 based on the result of the comparison, the racket selection unit 243 selects Revox 2.0, which has a lower power index value than Revox 4.0, and display or the like is performed on the output unit 21. In this way, the player makes actual hits using Revox 2.0, and the results are displayed in a graph. This result is the straight line indicated by (iii) in FIG. 9. According to this result, both the flat velocity component and the spin velocity component have increased, but the amount of increase is slight and does not exceed the reference evaluation indicator. Here, when Revox 4.0 and Revox 2.0 are compared, "ball grip" and "response" are high, and therefore based on the result obtained by the indicator comparison unit 242, the racket selection unit 243 selects a racket that has lower index values for "ball grip" and "impact shock". Specifically, Revov 3.0 is selected.

Next, the player makes actual hits using Revov 3.0, and the results are displayed in a graph. This result is the straight line indicated by (iv) in FIG. 9. According to this result, both the flat velocity component and the spin velocity component have increased greatly and exceed the reference evaluation indicator. Revov 3.0 is therefore ultimately recommended.

Figure 10:
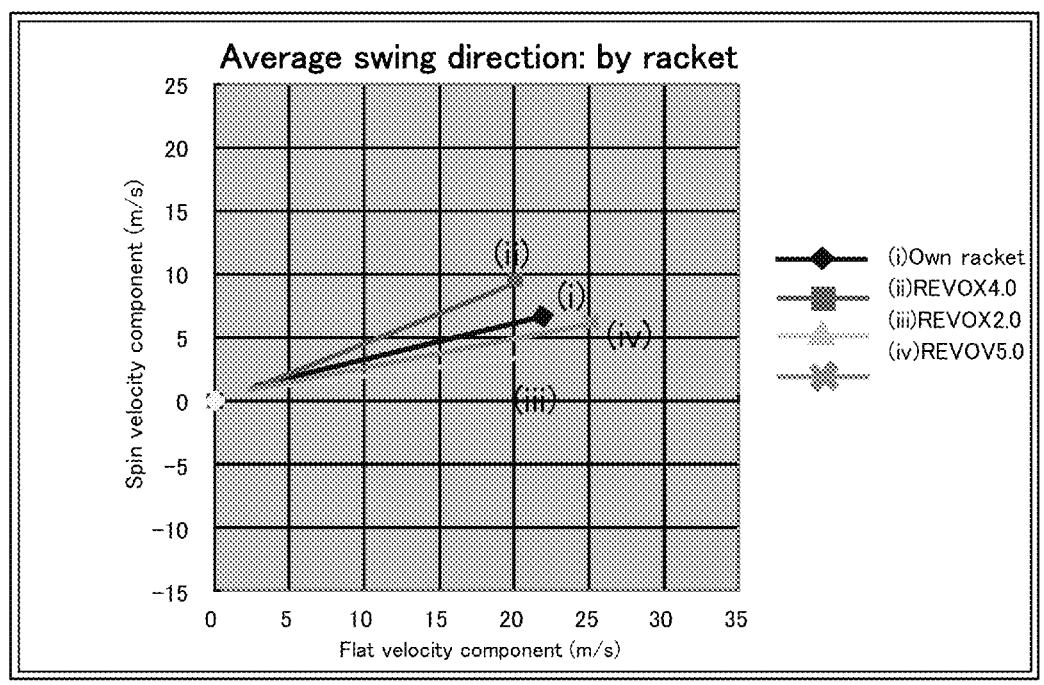
FIG. 10 is a graph showing an example of fitting.

Next, the second fitting example is shown in FIG. 10. First, the player swings his own racket, and a reference evaluation indicator is calculated. This player is a female intermediate tennis player. The reference evaluation indicator calculated here is the straight line indicated by (i) in FIG. 10. Next, swings are performed using Revox 4.0 as the test tennis racket, and a test evaluation indicator is calculated. This result is the straight line indicated by (ii) in FIG. 10. A comparison of these indicators shows that the spin velocity component improved, but the swing speed decreased for the racket in the case of (ii) compared to (i). It is understood from the improvement in the spin velocity component that the upswing increased, and therefore upswing needs to be suppressed. In view of this, the racket selection unit 243 references Table 2 and selects Neomax 2000, which has lower "power" and higher "ball grip". In this way, the player makes actual hits using Neomax 2000, and the results are displayed in a graph. This result is the straight line indicated by (iii) in FIG. 10. According to this straight line, the upswing of the swing is lower, but the swing speed is not higher. Accordingly, there is the possibility of being suppressed by "impact shock" (impact force), and therefore the racket selection unit 243 selects Revov 5.0, which has lower "impact shock". The player then makes actual hits using Revov 5.0, and the results are displayed in a graph. This result is the straight line indicated by (iv) in FIG. 10. It is understood from this graph that the swing speed has improved over that of the player's own racket. Revov 5.0 is therefore ultimately recommended.

Various methods can be used to set the reference for the selection performed by the racket selection unit 243, one example of which is setting performed as described below.

TABLE 4

|  |  | Power | Ball grip | Impact shock |
|---|---|---|---|---|
| Head velocity | To decrease: | Raise | Raise | Raise |
|  | To increase: | Lower | Lower | Lower |
| Head velocity | To decrease: | Raise | Lower | Raise |

TABLE 4-continued

| | | Power | Ball grip | Impact shock |
|---|---|---|---|---|
| (flat velocity component) | To increase: | Lower | Raise | Lower |
| Head velocity (spin velocity component) | To decrease: | Lower | Raise | Lower |
| | To increase: | Raise | Lower | Raise |
| Grip velocity | To decrease: | Raise | Raise | Raise |
| | To increase: | Lower | Lower | Lower |
| Head acceleration | To decrease: | Raise | Raise | Raise |
| | To increase | Lower | Lower | Lower |
| Grip acceleration | To decrease: | Raise | Raise | Raise |
| | To increase: | Lower | Lower | Lower |
| Head velocity component ratio Absolute value of (Vz/Vx) | To decrease: | Lower | Raise | Lower |
| | To increase: | Raise | Lower | Raise |
| Swing trajectory (front/back range of swing) | To decrease: | Raise | Lower | Raise |
| | To increase: | Lower | Raise | Lower |
| Swing trajectory (up/down range of swing) | To decrease: | Lower | Raise | Lower |
| | To increase: | Raise | Lower | Raise |
| Racket angular velocity | To decrease: | Lower | Raise | Lower |
| | To increase: | Raise | Lower | Raise |

4. Features

As described above, according to the present embodiment, at least one type of racket property that influences a swing for hitting a ball is specified for multiple test tennis rackets. Also, an evaluation indicator for swing evaluation is calculated from measured values obtained by measurement when a racket is swung, and evaluation is performed on that racket. A racket that can improve the evaluation indicator is then selected from among the test tennis rackets based on the racket property. Accordingly, in racket fitting, the racket that is to be swung next is selected based on a racket property, thus enabling finding a racket that is suited to the user with fewer swings compared to the case of simply trying multiple rackets. This makes efficient fitting possible.

Also, racket evaluation indicators are calculated based on acceleration and angular velocity measured by swinging a reference tennis racket and at least one test tennis racket at least one time in order to hit a tennis ball. A test tennis racket for which a calculated evaluation indicator is higher than that of the reference tennis racket is then determined, based on a predetermined reference, to be a recommended tennis racket that is suited to the player. A determination can therefore be made based on swings that reflect the actual hitting of a ball. Also, an evaluation indicator calculated based on acceleration and angular velocity measured in swings is used to determine that a test tennis racket that obtains a higher evaluation indicator than that of the reference tennis racket is the recommended tennis racket, thus making it possible to reliably obtain a tennis racket that is suited to the player. The reference tennis racket can be the racket that the player currently uses, for example. This fitting method enables obtaining a racket that is reliably more suited to the player than the current racket is.

5. Variations

The present invention is not limited to the above-described embodiment, and various modifications can be made without departing from the gist of the invention.

5-1

Although "power", "ball grip", and "impact shock" are employed as racket properties in the above-described embodiment, other racket properties can be used.

Alternatively, racket specifications can be directly used. Usable examples include the racket weight, face area, maximum frame thickness, minimum frame thickness, flex, length, number of main strings, and number of cross strings. These features will be briefly described below.

(i) Weight: swing speed improves as weight decreases, and swing speed decreases as weight increases. Power becomes too high if weight is too low, and therefore weight reduction is suppressed, but there are also cases where the swing speed decreases.

(ii) Face area: as face area increases, power and ball grip increase, and impact shock decreases.

(ii) Maximum frame thickness: see below regarding frame thickness.

(iv) Minimum frame thickness: as minimum frame thickness increases, power increases, and ball grip and impact shock decrease.

(v) Flex: as flex increases (as hardness increases), power increases, and ball grip and impact shock decrease.

(vi) Length: as length increases, power increases.

(vii) Number of main strings: see below regarding number of strings.

(viii) Number of cross strings: as number increases, power and ball grip decrease, and impact shock increases.

As described above, various parameters can be used for the racket properties, and efficient racket selection can be performed by referencing such racket properties.

5-2

Although fitting is performed using evaluation indicators at the time instant when the head velocity is the highest in the above-described embodiment, this is merely one example. Accordingly, evaluation indicators at time instants other than when the head velocity is the highest can be used, and evaluation indicators other than head velocity can be used. The following are examples of other evaluation indicators.

(1) Fitting Using Speed Before/after Impact

The head velocity gradually rises from when the swing starts, the head 103 then rapidly decelerates upon impact with the tennis ball, and thereafter the head velocity again rises due to follow-through of the racket, and then decelerates. Accordingly, a peak occurs in the swing immediately before impact with the tennis ball and during subsequent follow-through. As the difference between the highest head velocity immediately before impact and the highest head velocity during follow-through decreases, the better the swing-through of the racket is, and the more the racket can be said to be suited to the player. Accordingly, this difference can be used as an evaluation indicator, and the recommended racket is a racket for which this difference is low.

(2) Fitting Using Acceleration at Impact

Acceleration at impact is high with a racket that is suited to the player. Accordingly, the acceleration at impact can be used as an evaluation indicator.

(3) Fitting Using the Time from Swing Start to Impact

With a racket that is suited to the player, the time from when grip is swung at the start of the swing to impact is short and stable. Accordingly, this time can be used as an evaluation indicator. Specifically, the recommended racket is a racket for which this time is short.

5-3

Although a swing in a groundstroke is measured in the above-described embodiment, a swing during a volley or a serve can be used. A volley is when a tennis ball that was hit by the other player is directly hit before falling to the ground of the tennis court. A serve is when a player tosses a tennis ball upward and then directly hits it toward the opponent's side 73 before it falls to the ground of the tennis court.

In both a swing during a volley and a swing during a serve, indicators such as the grip acceleration, the grip velocity, the head velocity, the head acceleration, the head velocity component ratio, the swing trajectory, and the racket angular velocity can be obtained from measured values from the triaxial acceleration sensor 111 and the triaxial gyroscope 112. References similar to the determination references for racket fitting in the case of a groundstroke can be applied as the determination references in the case of a volley and a serve as well.

5-4

Although the acceleration and the angular velocity of the racket is measured in the above description, it is possible to measure the position and velocity of the racket, and calculate the above-described evaluation indicators from such information. Also, there is no need to use all of the measured values, and it is sufficient that evaluation indicators are calculated using only necessary measured values.

5-5

Although the triaxial acceleration sensor 111 and the triaxial gyroscope 112 are used in the measuring device 1 in the above description, other sensors can be used as long as it is possible to measure the position, the velocity, the acceleration, and the angular velocity of the racket.

5-6

Although data measured by the measuring device 1 is transmitted to the analyzing apparatus 2 by wireless communication in the above-described embodiment, a configuration is possible in which data measured by the measuring device 1 is recorded in an external storage apparatus such as a USB memory, and data in the external storage apparatus is then stored on the storage unit 23 via the communication unit 25 of the analyzing apparatus 2.

5-7

Also, the measurement of the acceleration and the angular velocity of the racket can be performed by a means other than the above-described measuring device. For example, the position, the velocity, the acceleration, and the angular velocity of the racket can be measured by filming the player during swinging and subjecting the captured video to image processing.

The invention claimed is:

1. A tennis racket fitting method for selecting a suitable tennis racket for a particular user, the method comprising:
a first step of preparing a plurality of test tennis rackets, at least one type of racket property that influences swing for hitting a ball being defined for each of the plurality of test tennis rackets, and setting index values by quantifying the at least one type of racket property for each of the plurality of test tennis rackets;
a second step of making the particular user swing a reference tennis racket at least one time in order to hit a tennis ball, and obtaining a measured value by measuring transition in selected one or more of the position, the velocity, the acceleration, and the angular velocity of the reference tennis racket in at least a portion of an interval from when the swing starts until when the swing ends, the reference tennis racket being not included in the plurality of test tennis rackets;
a third step of calculating at least one evaluation indicator to be an evaluation of the swing of the reference tennis racket based on the measured value, the at least one evaluation indicator being different from the at least one type of racket property but being subjected to a magnitude of the at least one type of racket property; and
a fourth step of referring to the calculated at least one evaluation indicator of the reference tennis racket in the third step and the index values of the plurality of test tennis rackets set in the first step, and selecting one of the plurality of test tennis rackets for said particular user based on a predetermined correlation between the at least one type of racket property and the at least one evaluation indicator, without having the particular user swing any of the plurality of test tennis rackets before the selection,
wherein the selection in the fourth step is resulted from an evaluation that the at least one evaluation indicator of the selected one of the plurality of test tennis rackets would be improved compared to the at least one evaluation indicator of the reference tennis racket calculated in the third step, and the selected one of the plurality of test tennis rackets is for the particular user to be test swung after being selected.

2. The tennis racket fitting method according to claim 1, further comprising:
a fifth step of making the particular user swing the selected tennis racket from the fourth step at least one time in order to hit the tennis ball, and obtaining a measured value by measuring transition in selected one or more of the position, the velocity, the acceleration, and the angular velocity of the selected tennis racket in at least a portion of an interval from when the swing starts until when the swing ends;
a sixth step of calculating at least one evaluation indicator to be an evaluation of the swing of the selected tennis racket from the fourth step based on the measured value from the fifth step; and
a seventh step of referring to the calculated at least one evaluation indicator of the selected tennis racket in the sixth step and the index values of the plurality of test tennis rackets set in the first step, and selecting one of the rest of the plurality of test tennis rackets for said particular user based on a predetermined correlation between the at least one type of racket property and the at least one evaluation indicator, without having the particular user swing any of the rest of the plurality of test tennis rackets before the selection,
wherein the selection in the seventh step is resulted from an evaluation that the at least one evaluation indicator of the selected one of the rest of the plurality of test tennis rackets would be improved compared to the at least one evaluation indicator of the selected tennis racket from the fourth step which is calculated in the sixth step, and the selected one of the rest of the plurality of test tennis rackets is for the particular user to be test swung after being selected, and
wherein the fifth step, the sixth step and the seventh step are repeated at least one time after the fourth step.

3. The tennis racket fitting method according to claim 1, wherein the racket property is at least one of the weight, the face area, the maximum frame thickness, the minimum frame thickness, the flex, the length, the number of main strings, and the number of cross strings of the test tennis racket.

4. The tennis racket fitting method according to claim 1, wherein the racket property is a numerical value defined using at least one of the weight, the face area, the maximum frame thickness, the minimum frame thickness, the flex, the length, the number of main strings, and the number of cross strings of the test tennis racket.

5. The tennis racket fitting method according to claim 4, wherein one racket property is a power property quantified using at least the face area so as to reflect a ball flight distance.

6. The tennis racket fitting method according to claim 4, wherein one racket property is a ball grip property quantified using at least the flex so as to reflect suitability of a timing of ball release.

7. The tennis racket fitting method according to claim 4, wherein one racket property is an impact shock property quantified using at least the maximum frame thickness so as to reflect suitability of a sense of impact during a hit.

8. The tennis racket fitting method according to claim 1,
wherein in the second step, a plurality of measured values are acquired by performing the swing of the test tennis racket a plurality of times, and
in the third step, the evaluation indicator is calculated by averaging the evaluation indicators calculated from the plurality of measured values.

9. A non-transitory computer-readable recording medium storing a tennis racket fitting program for causing a computer to perform:
a first step of storing information regarding a plurality of test tennis rackets, at least one type of racket property that influences swing for hitting a ball being defined for each of the plurality of test tennis rackets, index values being set by quantifying the at least one type of racket property for each of the plurality of test tennis rackets;
a second step of when a reference tennis racket is swung at least one time by a particular user in order to hit a tennis ball, receiving, as a measured value, transition in selected one or more of the position, the velocity, the acceleration, and the angular velocity of the reference tennis racket measured in at least a portion of an interval from when the swing starts until when the swing ends, the reference tennis racket being not included in the plurality of test tennis rackets;
a third step of calculating at least one evaluation indicator to be an evaluation of the swing of the reference tennis racket based on the measured value, the at least one evaluation indicator being different from the at least one type of racket property but being subjected to a magnitude of the at least one type of racket property; and
a fourth step of referring to the calculated at least one evaluation indicator of the reference tennis racket in the third step and the index values of the plurality of test tennis rackets set in the first step, and selecting one of the plurality of test tennis rackets for said particular user based on a predetermined correlation between the at least one type of racket property and the at least one evaluation indicator, without having the particular user swing any of the plurality of test tennis rackets before the selection,
wherein the selection in the fourth step is resulted from an evaluation that the at least one evaluation indicator of the selected one of the plurality of test tennis rackets would be improved compared to the at least one evaluation indicator of the reference tennis racket calculated in the third step, and the selected one of the plurality of test tennis rackets is for the particular user to be test swung after being selected.

10. The non-transitory computer-readable recording medium according to claim 9, further comprising:
a fifth step of, when the selected tennis racket from the fourth step is swung at least one time by the particular user in order to hit a tennis ball, receiving, as a measured value, transition in selected one or more of the position, the velocity, the acceleration, and the angular velocity of the selected tennis racket measured in at least a portion of an interval from when the swing starts until when the swing ends;
a sixth step of calculating at least one evaluation indicator to be an evaluation of the swing of the selected tennis racket from the fourth step based on the measured value from the fifth step; and
a seventh step of referring to the calculated at least one evaluation indicator of the selected tennis racket in the sixth step and the index values of the plurality of test tennis rackets set in the first step, and selecting one of the rest of the plurality of test tennis rackets for said particular user based on a predetermined correlation between the at least one type of racket property and the at least one evaluation indicator, without having the particular user swing any of the rest of the plurality of test tennis rackets before the selection,
wherein the selection in the seventh step is resulted from an evaluation that the at least one evaluation indicator of the selected one of the rest of the plurality of test tennis rackets would be improved compared to the at least one evaluation indicator of the selected tennis racket from the fourth step which is calculated in the sixth step, and the selected one of the rest of the plurality of test tennis rackets is for the particular user to be test swung after being selected, and
wherein the fifth step, the sixth step and the seventh step are repeated at least one time after the fourth step.

11. The non-transitory computer-readable recording medium according to claim 9, wherein the racket property is at least one of the weight, the face area, the maximum frame thickness, the minimum frame thickness, the flex, the length, the number of main strings, and the number of cross strings of the test tennis racket.

12. The non-transitory computer-readable recording medium according to claim 9, wherein the racket property is a numerical value defined using at least one of the weight, the face area, the maximum frame thickness, the minimum frame thickness, the flex, the length, the number of main strings, and the number of cross strings of the test tennis racket.

13. The non-transitory computer-readable recording medium according to claim 12, wherein one racket property is a power property quantified using at least the face area so as to reflect a ball flight distance.

14. The non-transitory computer-readable recording medium according to claim 12, wherein one racket property is a ball grip property quantified using at least the flex so as to reflect suitability of a timing of ball release.

15. The non-transitory computer-readable recording medium according to claim 12, wherein one racket property is an impact shock property quantified using at least the maximum frame thickness so as to reflect suitability of a sense of impact during a hit.

16. The non-transitory computer-readable recording medium according to claim 9,
wherein in the second step, a plurality of measured values obtained from the swing of the test tennis racket a plurality of times, are received, and
in the third step, the evaluation indicator is calculated by averaging the evaluation indicators calculated from the plurality of measured values.

17. An analyzing apparatus for tennis racket fitting comprising:
- a first storage unit storing information regarding a plurality of test tennis rackets, at least one type of racket property that influences swing for hitting a ball being defined for each of the plurality of test tennis rackets, index values being set by quantifying the at least one type of racket property for each of the plurality of test tennis rackets;
- a second storage unit storing, when a reference tennis racket is swung at least one time by a particular user in order to hit a tennis ball, as a measured value, transition in selected one or more of the position, the velocity, the acceleration, and the angular velocity of the reference tennis racket measured in at least a portion of an interval from when the swing starts until when the swing ends, the reference tennis racket being not included in the plurality of test tennis rackets;
- a calculation unit that calculates at least one evaluation indicator to be an evaluation of the swing of the reference tennis racket based on the measured value, the at least one evaluation indicator being different from the at least one type of racket property but being subjected to a magnitude of the at least one type of racket property; and
- a racket selection unit that refers to the calculated at least one evaluation indicator of the reference tennis racket and the index values of the plurality of test tennis rackets, and selects one of the plurality of test tennis rackets for said particular user based on a predetermined correlation between the at least one type of racket property and the at least one evaluation indicator, without having the particular user swing any of the plurality of test tennis rackets before the selection,
- wherein the racket selection unit is configured to make the section based on an evaluation that the at least one evaluation indicator of the selected one of the plurality of test tennis rackets would be improved compared to the at least one evaluation indicator of the reference tennis racket.

* * * * *